(12) United States Patent
Roberts et al.

(10) Patent No.: US 11,483,603 B1
(45) Date of Patent: Oct. 25, 2022

(54) SYSTEMS AND METHODS FOR ASYNCHRONOUS GROUP CONSUMPTION OF STREAMING MEDIA

(71) Applicant: Discovery.com, LLC, New York, NY (US)

(72) Inventors: Brian F. Roberts, Dallas, TX (US); Chad Peltola, Fairfield, CT (US)

(73) Assignee: Discovery.com, LLC, New York, NY (US)

( * ) Notice: Subject to any disclaimer, the term of this patent is extended or adjusted under 35 U.S.C. 154(b) by 0 days.

(21) Appl. No.: 17/587,227

(22) Filed: Jan. 28, 2022

(51) Int. Cl.
| | |
|---|---|
| *H04N 21/242* | (2011.01) |
| *H04N 21/239* | (2011.01) |
| *H04N 21/488* | (2011.01) |
| *H04N 21/45* | (2011.01) |
| *H04N 21/43* | (2011.01) |
| *H04N 21/466* | (2011.01) |
| *H04N 21/858* | (2011.01) |
| *H04N 21/4788* | (2011.01) |

(52) U.S. Cl.
CPC ....... *H04N 21/242* (2013.01); *H04N 21/2393* (2013.01); *H04N 21/43076* (2020.08); *H04N 21/4532* (2013.01); *H04N 21/4668* (2013.01); *H04N 21/4788* (2013.01); *H04N 21/4882* (2013.01); *H04N 21/8586* (2013.01)

(58) Field of Classification Search
CPC ............. H04N 21/242; H04N 21/2393; H04N 21/43076; H04N 21/4532; H04N 21/4668; H04N 21/4788; H04N 21/4882; H04N 21/8586
See application file for complete search history.

(56) References Cited

U.S. PATENT DOCUMENTS

| | | | |
|---|---|---|---|
| 2012/0030587 A1* | 2/2012 | Ketkar | H04N 21/47 715/751 |
| 2012/0117017 A1* | 5/2012 | Phillips | H04N 21/4826 706/50 |
| 2012/0262576 A1* | 10/2012 | Sechrist | H04N 21/21805 348/E5.031 |
| 2013/0110848 A1* | 5/2013 | Svendsen | G06F 16/435 707/748 |
| 2014/0108559 A1* | 4/2014 | Grochowicz | G06F 15/16 709/227 |
| 2014/0226953 A1* | 8/2014 | Hou | H04N 21/4788 386/230 |

* cited by examiner

*Primary Examiner* — Michael R Telan
(74) *Attorney, Agent, or Firm* — Bookoff McAndrews, PLLC

(57) ABSTRACT

Systems and methods for providing asynchronous consumption of streaming media are disclosed. One computer-implemented method may include: receiving, from a first user device associated with a first user, a request to share a multimedia content with a second user, the request identifying the multimedia content, a first user profile associated with the first user, and data associated with the second user; retrieving a second user profile associated with the second user based on the received request; causing to be displayed, on a second user device associated with the second user, a notification alerting the second user of the request; receiving, from the second user device, a response accepting the request; and linking the first user profile with the second user profile for the shared multimedia content to enable viewing activity of both the first user and the second user to be shared and synced with one another.

20 Claims, 17 Drawing Sheets

SYSTEMS AND METHODS FOR ASYNCHRONOUS GROUP CONSUMPTION OF STREAMING MEDIA

TECHNICAL FIELD

Various embodiments of the present disclosure relate generally to the field of multimedia content streaming, and, more particularly, to enabling asynchronous group consumption of media by users of a media streaming application platform.

BACKGROUND

With the rapid rise of at-home entertainment, many individuals may more easily access and interact with a vast array of multimedia content, such as television shows, films, documentaries, and the like, via subscription-based video streaming platforms. Individuals may have more control over the content they watch, how they watch it, and where they choose to watch it from. However, despite the many options and comforts that come with video streaming services, for some individuals, the content consumption experience may be isolating or limiting if they, for example, live alone or if their friends live far away. For others, the content consumption experience may be limited to a small group of people, such as, for example, the people they live with (e.g., roommates, family members).

One significant part of the multimedia consumption experience may be the ability to share one's viewing experience with other people. Enabling individuals to engage in a remote (e.g., virtual) shared viewing may allow individuals to open up and connect with one another as they take part in the same viewing experience. The present disclosure is accordingly directed to optimizing the shared viewing experience.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for enabling asynchronous consumption of streaming media by a group of users.

In one aspect, a system for asynchronous consumption of streaming media may include at least one database and a server in network communication with the at least one database. The server may be configured to perform operations including: receiving, from a first user device associated with a first user, a request to share a multimedia content with a second user, the request identifying the multimedia content to be shared, a first user profile associated with the first user, and data associated with the second user; retrieving, from the at least one database, a second user profile associated with the second user based on the received request, the second user profile identifying a second user device associated with the second user; causing to be displayed, on the second user device associated with the second user, a notification alerting the second user of the request; receiving, from the second user device, a response accepting the request; and linking the first user profile with the second user profile for the shared multimedia content to enable viewing activity of both the first user and the second user to be shared and synced with one another.

In another aspect, a computer-implemented method for asynchronous consumption of streaming media using a server in network communication with at least one database may be provided. The method may comprise operations including: receiving, from a first user device associated with a first user, a request to share a multimedia content with a second user, the request identifying the multimedia content to be shared, a first user profile associated with the first user, and data associated with the second user; retrieving, from the at least one database, a second user profile associated with the second user based on the received request, the second user profile identifying a second user device associated with the second user; causing to be displayed, on the second user device associated with the second user, a notification alerting the second user of the request; receiving, from the second user device, a response accepting the request; and linking the first user profile with the second user profile for the shared multimedia content to enable viewing activity of both the first user and the second user to be shared and synced with one another.

In yet another aspect, a non-transitory computer-readable medium storing computer-executable instructions may be provided. The instructions, when executed by a server in network communication with at least one database, may cause the server to perform operations comprising: receiving, from a first user device associated with a first user, a request to share a multimedia content with a second user, the request identifying the multimedia content to be shared, a first user profile associated with the first user, and data associated with the second user; retrieving, from the at least one database, a second user profile associated with the second user based on the received request, the second user profile identifying a second user device associated with the second user; causing to be displayed, on the second user device associated with the second user, a notification alerting the second user of the request; receiving, from the second user device, a response accepting the request; and linking the first user profile with the second user profile for the shared multimedia content to enable viewing activity of both the first user and the second user to be shared and synced with one another.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
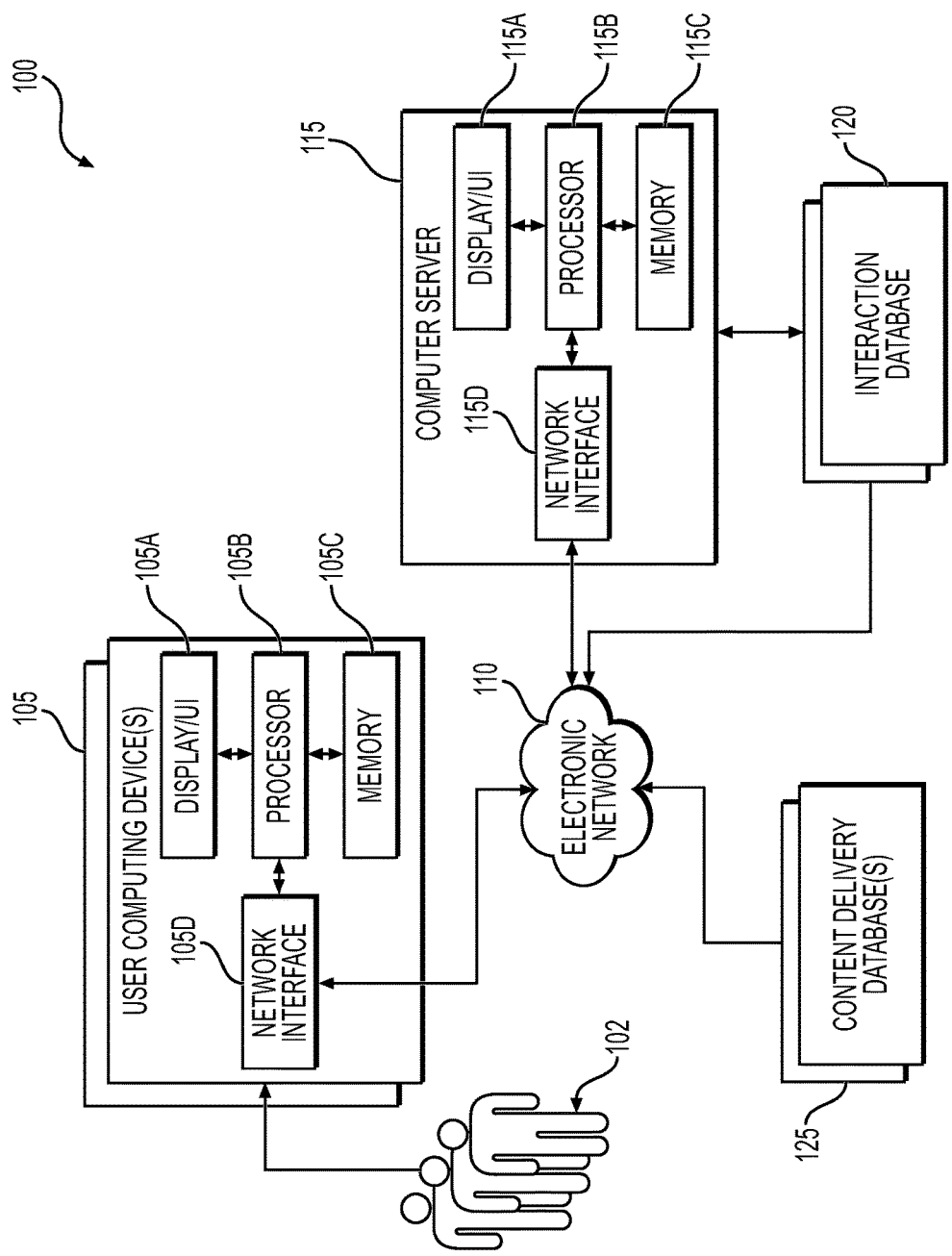
FIG. 1 depicts an exemplary system infrastructure, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

The term "user", "subscriber," and the like generally encompasses consumers who are subscribed to a streaming service (e.g., streaming platform) associated with the system described herein. The term "streaming service" (e.g., streaming platform) may refer to subscription-based video-on-demand (SVoD) services such as television shows, films, documentaries, and the like. The term "user" may be used interchangeably with "user profile," "profile," and the like throughout this application. The phrase "linking users" may be used interchangeably with "linking user profiles" and the like throughout this application. The phrase "registered with" may be used interchangeably with "subscribed to" and the like throughout this application. The phrase "multimedia content" ma be used interchangeably with "multimedia content item" and the like throughout this application.

In the following description, embodiments will be described with reference to the accompanying drawings. As will be discussed in more detail below, in various embodiments, systems and methods for asynchronous consumption of streaming media are described.

In an exemplary use case, a first user's profile may share a multimedia content (e.g., content, multimedia content item), such as a show with someone. In particular, the first user may share a show that is to be consumed asynchronously with another user, such as a second user. "Asynchronous viewing" as described herein, refers to people watching the same content at separate times, but still enjoying a shared viewing experience. When a profile of one user has shared a show with someone else, either party (e.g., the first user or the second user) may elect to optionally share their progress in that show and add reactions and comments to the show to be consumed asynchronously. When a user elects to share and sync their viewing progress and activity with another user for a specific show, the two users may become connected in relation to that show (those users then optionally being referred to as "friends," "contacts," "buddies," or perhaps "binge buddies," in reference to "bingeing" content together). More specifically, the user profiles of each user may be linked (e.g., connected) together to enable the asynchronous viewing experience to take place between the two users). In further embodiments, more than two users may become binge buddies for a particular show. It should be appreciated that the terminology "buddies" or "binge buddies" should be construed as non-limiting and simply any association of two users together in relation to one or more pieces of electronic content. Further, multimedia content shared between two users may include, but is not limited to, video series (with episodes), movies, and/or documentaries across a variety of genres as well as broadcasts of live events (e.g., sports, music, news, performances).

While viewing the show, users may provide comments and reactions. If reactions from a binge buddy are available, the user may choose to enable those reactions during playback or watch the show normally. In addition to reactions, binge buddies may also leave comments at certain time markers in an episode (e.g., a video). This allows the user (e.g., an asynchronous viewer) to jump directly to or otherwise view the comments left by a binge buddy when playback hits that mark.

Additionally, a user may see a buddy's viewing progress within a shared content, such as a series, movie, or broadcast of a live sporting event. For example, the user may see how far their buddy is within a movie or documentary. In another example, the user may see where their buddy is (e.g., how far they are) within a series and which episodes their buddy has watched, is currently watching (but not yet finished), or has not yet started, thereby enabling the user and their buddy to discuss only what they have both seen to avoid spoiling any moments within the series. Further, once a user is linked to another user (e.g., are binge buddies), the users may benefit from each other's content activity (e.g., multimedia content items that each user has watched). In one embodiment, a recommendation rail may be displayed on each user's home screen based on the content activity of the user's binge buddies. This recommendation rail may allow each user to see what their friends are watching and to find content items that may be of interest to each user. Additionally, the recommendation rail may allow users to explore additional multimedia content items to watch and discuss with their friends.

In various embodiments, a user who has completed watching a shared content item may be notified of new binge buddy activity associated with their buddy. The user may receive notifications when their buddy starts (or is currently) watching a content item that the user has already watched (e.g., "Buddy B has just started Season 2, Episode 3, which you watched yesterday"). In further embodiments, the user may receive notifications each time the user's buddy completes an episode (e.g., finishes watching an episode). For example, the user may receive a notification of completion (e.g., "Buddy B just finished watching Season 2, Episode 3") along with a summary of any activity from the buddy, including comments, reactions, and favorite moments provided by the buddy while watching the episode. This may enhance the sharing experience between the user and their buddy by keeping each other informed of the other's activities within the shared show in a timely manner. This may allow the user and their buddy to keep up with each other within the shared show so they can share and discuss episodes without spoiling any moments for each other.

FIG. 1 is a diagram depicting an exemplary block diagram of a system environment 100 for enabling asynchronous consumption of multimedia content between at least two users, according to one or more embodiments of the present disclosure. The system environment 100 may include two or more user computing devices 105 operated by users 102, an electronic network 110, a computer server 115, an interaction database 120, and one or more content delivery databases 125. One of skill in the art would recognize that the server 115 may configure the one or more user computing devices 105 so as to experience different functionalities and/or have access to different information (e.g., determined by credentials such as user ID/password).

The user computing devices 105, the server 115, the interaction database 120 and/or the content delivery databases 125 may be connected via the network 110, using one or more standard communication protocols. The server 115 may be configured to receive data over the network 110 from the user computing devices 105, including, but is not limited to, requests to share multimedia content (e.g., share requests) and responses to share requests. "Interaction data" includes data received from the user computing devices 105 as well as data generated and analyzed by the computer server 115. Interaction data may be stored in the interaction database 120, and may include information as to which users are linked together, the multimedia content (e.g., movies, shows, documentaries) shared by linked users, the viewing progress (e.g., how far a user has watched the shared content), communications (e.g., reactions, comments, favorites) shared between linked users while watching the shared content, and notifications generated and transmitted by the computer server 115 to users. Information as to the viewing progress may include a timestamp associated with where a user left off in an episode or a movie. Additionally or alternatively, information as to the viewing progress may also indicate which episodes in a series that a user has completed watching. The server 115 may store the interaction data received over the network 110 in the interaction database 120.

In one or more embodiments, the computer server 115 and the interaction database 120 may be one server computer device and a single database, respectively. Alternatively, in one or more embodiments, the server 115 may be a server cluster, or any other collection or network of a plurality of computer servers. The interaction database 120 also may be a collection of a plurality of interconnected databases. The server 115 and the interaction database 120 may be components of one server system. Additionally, or alternatively, the server 115 and the interaction database 120 may be components of different server systems, with the network 110 serving as the communication channel between them. The computer server 115, the interaction database 120, and/or the content delivery databases 125 may be associated with an entity 130, such as a subscription-based streaming service provider (not shown). In some embodiments, the computer server 115, the interaction database 120, and/or the content delivery databases 125 may collectively be referred to as an entity system.

As shown in FIG. 1, the computer server 115 may be in communication with the user devices 105 to transmit and receive messages from each other across the network 110. The user devices 105 may be associated with users who are subscribed to a streaming service platform provided by the computer server 115. The network 110 may comprise one or more networks that connect devices and/or components of environment 100 to allow communication between the devices and/or components. For example, the network 110 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of environment 100. In some embodiments, the network 110 may be implemented using cell and/or pager networks, satellite, licensed radio, or a combination of licensed and unlicensed radio. The network 110 may be associated with a cloud platform that stores data and information related to methods disclosed herein.

The user computing device 105 may include a display/user interface (UI) 105A, a processor 105B, a memory 105C, and/or a network interface 105D. The user computing device 105 may be a personal computer (PC), a tablet PC, a set-top box (STB), a streaming device (e.g., Apple TV®, Amazon Fire®, Roku® player, Google Chromecast®), a television (TV), a smart TV, a gaming console, a personal digital assistant (PDA), a mobile device, a palmtop computer, a laptop computer, a desktop computer, etc. The user computing device 105 may execute, by the processor 105B, an operating system (O/S) and at least one application (each stored in memory 105C). The application may be a browser program or a mobile application program (which may also be a browser program in a mobile O/S). The application may generate one or more interactive graphic user interfaces (GUIs), such as, for example, the exemplary GUIs shown in FIGS. 3-15, based on instructions/information received from the server 115. In some embodiments, the application may generate one or more interactive GUIs based on instructions/information stored in the memory 105C. The interactive GUIs may be application GUIs for the application executed based on XML and Android programming languages or Objective-C/Swift, but one skilled in the art would recognize that this may be accomplished by other methods, such as webpages executed based on HTML, CSS, and/or scripts, such as JavaScript. The display/UI 105A may be a touch screen or a display with other input systems (e.g., mouse, keyboard, etc.). The network interface 105D may be a TCP/IP network interface for, e.g., Ethernet or wireless communications with the network 110. The processor 105B, while executing the application, may receive user inputs from the display/UI 105A, and perform actions or functions in accordance with the application.

The computer server 115 may include a display/UI 115A, a processor 115B, a memory 115C, and/or a network interface 115D. The server 115 may be a computer, system of computers (e.g., rack server(s)), and/or or a cloud service computer system. The server 115 may execute, by the processor 115B, an operating system (O/S) and at least one instance of a server program (each stored in memory 115C). The server 115 may store or have access to information from interaction database 120 and content delivery databases 125. The display/UI 115A may be a touch screen or a display with other input systems (e.g., mouse, keyboard, etc.) for an operator of the server 115 to control the functions of the server 115 (e.g., update the server program and/or the server information). The network interface 115D may be a TCP/IP network interface for, e.g., Ethernet or wireless communications with the network 110. The server program, executed by the processor 115B on the server 115, may be configured to identify interaction partners that align with a user's mission(s) of interest, as will be described in further detail below.

As described above, the interaction database 120 may store data associated with users subscribed to a streaming service platform associated with the computer server 115. In addition to the interaction data, the interaction database 120 may also store additional data received from user computing devices 105, including real time and/or near real time location data (e.g., GPS data) of the user computing devices 105. The interaction database 120 may also store recommendations generated by the computer server 115, such as recommendations for a user to watch a certain show, movie, and/or other multimedia content based on the past viewing activity (e.g., viewing history) of other user(s) to which the user is linked to.

The interaction database 120 may also store user profiles generated by the computer server 115 for the users 102. In some embodiments, the information described above, including the interaction data and any additional data received from user computing devices 105, may be stored in a plurality of user profiles within the interaction database 120. Each user profile may correspond to each user 102 in communication with the server 115. A user 102 may have multiple user computing devices 105 registered with the server 115 based on the user's 102 viewing habits and/or preferences. For example, one user may register a personal laptop, a smart TV, and a mobile device with the server 115. Information associated with registered user computing device(s) 105 and the user's 102 viewing habits and/or viewing preferences may all be stored within the user's user profile.

In some embodiments, in addition to the interaction data, each user profile may also include information associated with a respective user and their user computing device(s) 105 (e.g., a device identifier, device type), the user's name, a username or a nickname provided by the user for the user profile, content viewing preferences provided by the user, recommendations provided to the user by the server 115, the user's past viewing activity, IP addresses and locations (as well as accompanying dates and times) from where the user has logged in from, and/or user analytics generated by the server 115. In these embodiments, the user profiles may be updated to reflect a corresponding user's recent activities with another user, including sending or accepting a share request.

In the system environment 100, the computer server 115 may retrieve multimedia content requested by users from the content delivery databases 125 to enable requested content to be streamed by users on the user computing devices 105. The content delivery databases 125 may store volumes of multimedia content items, including, for example, video series, movies, documentaries, and additional programming content that may be streamed by users 102 on the user computing devices 105. In some embodiments, the content delivery databases 125 may be maintained by third party content providers. In other embodiments, the content delivery databases 125 may be maintained by the server 115 and/or additional servers associated with the server 115.

Figure 2:
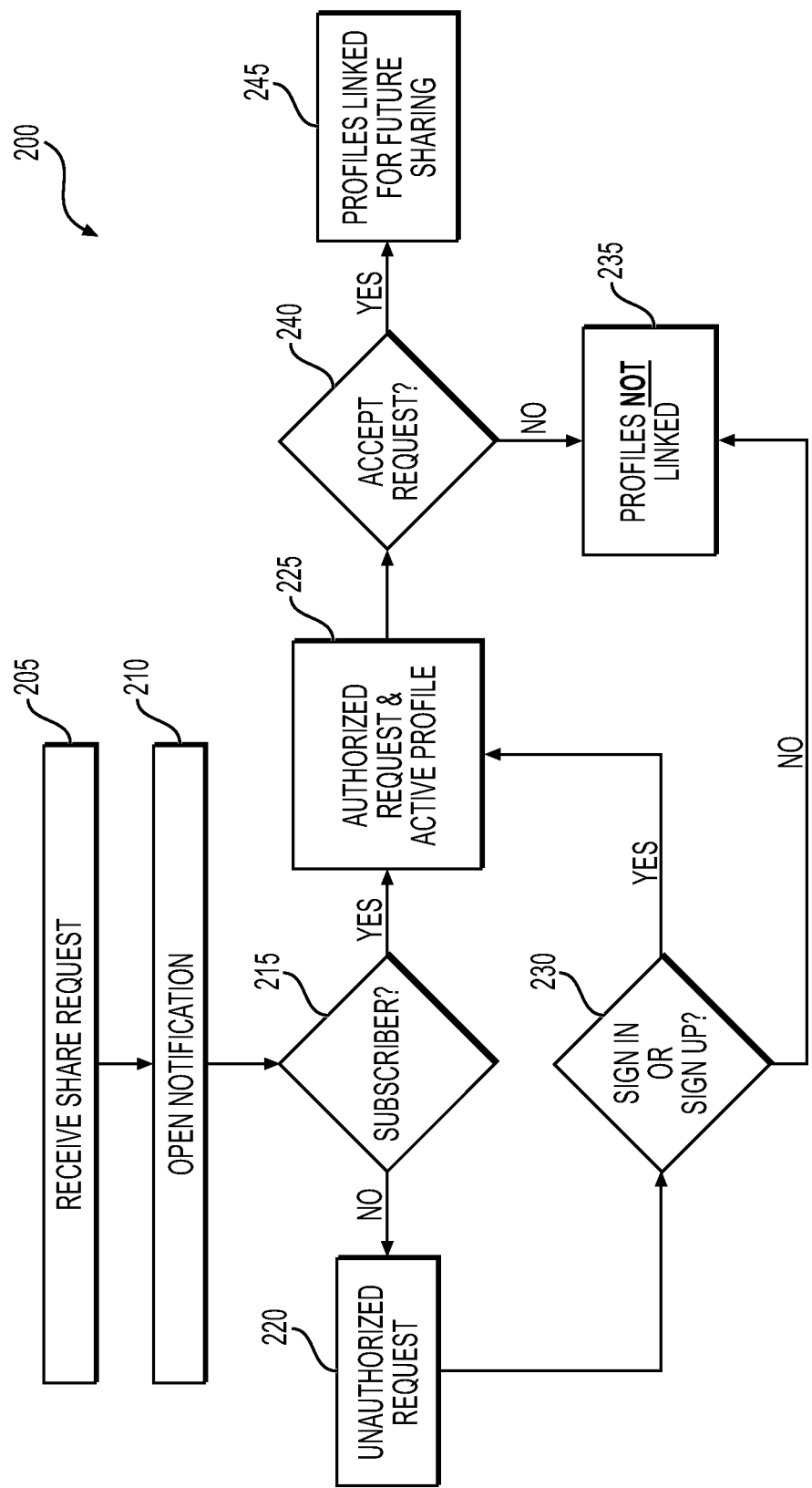
FIG. 2 depicts an exemplary process flow for linking user profiles, according to one or more embodiments.

FIG. 2 depicts an exemplary process flow 200 for linking user profiles for future content sharing purposes, according to one or more embodiments of the present disclosure. By linking the user profiles of two or more users, the user computing device 105 enables the linked (e.g., connected) users to easily share and asynchronously view multimedia content items together within the content streaming service platform operated by the computer server 115. The exemplary process flow 200 may be implemented by system environment 100, which includes user computing devices 105 associated with users 102, computer server 115, interaction database 120, and content delivery databases 125 (all shown in FIG. 1).

At block 205, a first user (e.g., "user A") transmits a share request (e.g., an invitation) for a second user (e.g., "user B"). The share request described in FIG. 2 is an invitation from a user to connect with another user, and more specifically, to be linked together by computer server 115 for future content sharing purposes. The share request may be transmitted from user A's user computing device 105, and may identify a user (e.g., "user B") with whom user A requests to be linked together with. In various embodiments, as described below with reference to FIGS. 8-10, the share request may also identify a multimedia content item, such as a video series or an episode, that user A would like to share with user B.

In some embodiments, the computer server 115 may receive the share request from user A, and may subsequently d provide user A with a URL to share the identified multimedia content item with user B, such as, for example, URL 715, as described below with reference to FIG. 7. In these embodiments, user A may transmit the URL to user B. At block 210, user B receives and opens a notification regarding the share request on user B's user computing device 105. In some embodiments, the notification may be a text message (e.g., SMS messages, MMS messages) or an email including the URL from user A, as described below with reference to FIGS. 6-7. In these embodiments, when user B clicks or selects the customized URL, the computer server 115 may determine whether user B is a subscriber to the content streaming service platform, as shown at block 215.

In FIG. 2, user A is a subscriber of the content streaming service platform associated with computer server 115. At block 215, the computer server 115 may query interaction database 120 to determine whether user B is a subscriber. For example, the share request may include a user identifier associated with user B. In this example, the computer server 115 may use this user identifier to query the interaction database 120 to locate a user profile associated with user B within the interaction database 120. If a user profile associated with user B is found within the interaction database 120, the computer server 115 may determine that user B is subscribed to the content streaming service platform, and accordingly, is registered with the computer server 115. If a user profile associated with user B cannot be found within the interaction database 120, the computer server 115 may determine that user B is not subscribed to the content streaming service platform, and accordingly, is not registered with the computer server 115. For example, the share request may include an identifier that does not return a user profile for user B or the share request may otherwise not include an identifier for user B.

In FIG. 2, if user B is determined to be a subscriber at block 215, then exemplary process flow 200 proceeds to block 225, where the share request is authorized by the computer server 115, and where the computer server 115 determines that an active user profile exists for user B. If at block 215, the computer server 115 determines that user B is not a subscriber to the content streaming service platform at block 215, then exemplary process flow 200 proceeds to block 220, where the share request is determined to be an unauthorized request. At block 230, the computer server 115 may prompt user B to sign into the content streaming service platform if user B is an existing subscriber or to sign up for the content streaming service platform as a new subscriber. If the computer server 115 determines that user B has either signed into or signed up for the content streaming service platform, the exemplary process flow 200 proceeds to block 225, where the share request is authorized by the computer server 115, and where the computer server 115 determines that an active user profile exists for user B. If the computer server 115 determines that user B has not signed into or signed up for the content streaming service platform, the exemplary process flow 200 proceeds to block 235, where the computer server 115 declines to link the two users together.

In exemplary flow 200, upon authorizing the share request at block 225, the computer server 115 may prompt user B to either accept or reject the share request from user A at block 240. If user B accepts the share request at block 240, the exemplary process flow 200 proceeds to block 245, where the computer server 115 links the two users together by linking user A's user profile with user B's user profile for future content sharing purposes. As discussed in detail below with reference to FIGS. 9-10, the user profiles of users A and B may be linked together for a multimedia content item, such as a show (e.g., a video series) or an episode. If however, user B declines (e.g., rejects) the share request at block 240, the exemplary process flow 200 proceeds to block 235, where the computer server 115 does not link the two user profiles together.

Figure 3:
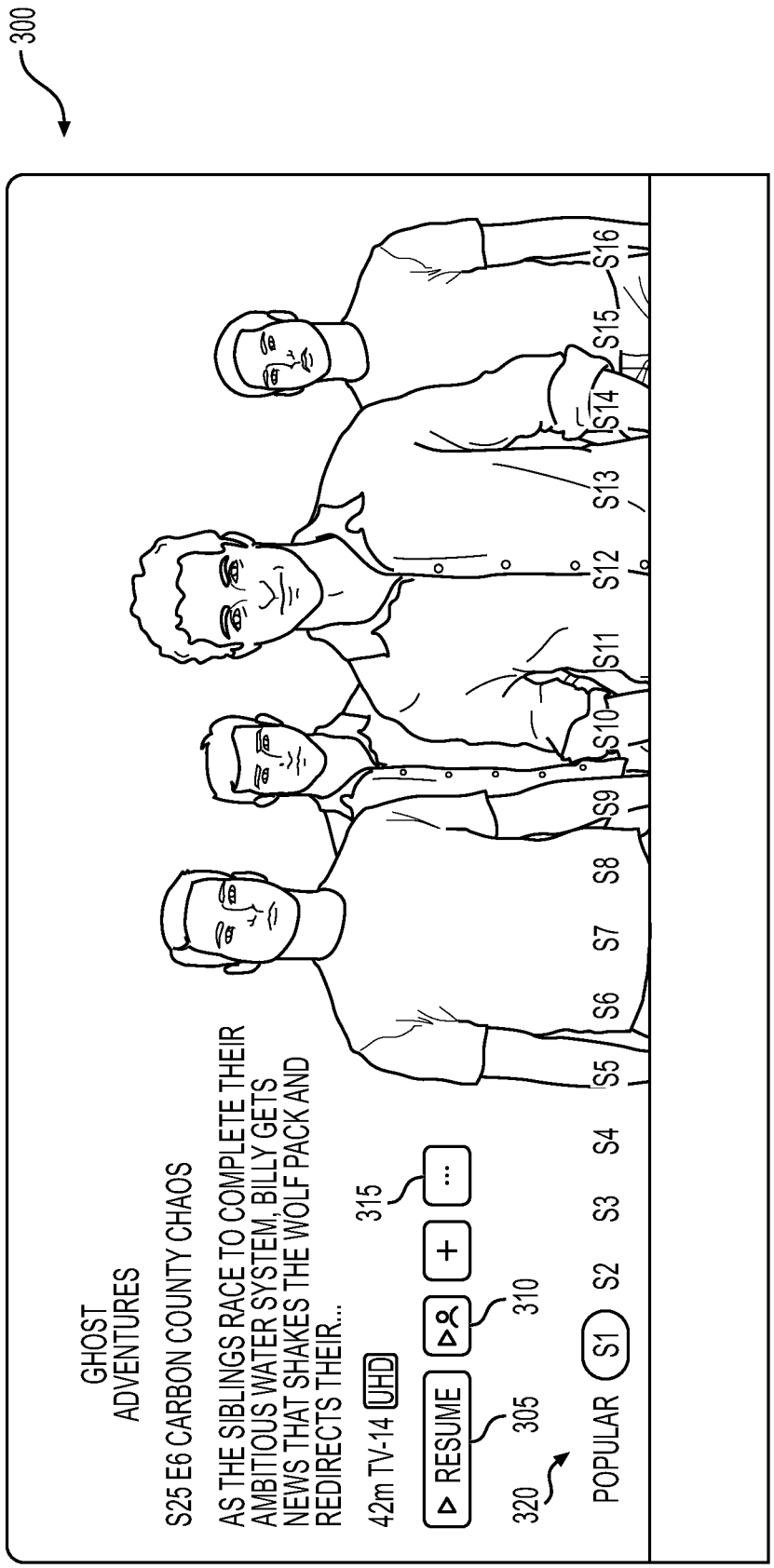
FIG. 3 depicts an exemplary interactive graphical user interface (GUI) for providing details of a multimedia content to be shared, according to one or more embodiments.

FIGS. 3-7 depict exemplary interactive graphical user interfaces (GUIs) 300-700 for recommending a multimedia content item by a first user to a second user (e.g., users 102, shown in FIG. 1), according to one or more embodiments of the present disclosure. Exemplary GUIs 300-600 may be generated by the computer server 115 for display at the first user's user computing device 105 (shown in FIG. 1), such as the first user's TV or personal laptop. Exemplary GUI 700 may be generated for display at the first user's mobile device (e.g., smartphone). In FIG. 3, exemplary GUI 300 depicts a details screen of a multimedia streaming application generated by the computer server 115.

As shown in exemplary GUI 300, the details screen identifies the multimedia content item to be shared (e.g., in a share request, as described above with respect to FIG. 2), which is a show with multiple seasons 302. The details screen includes a first icon 305 configured to allow the first user to start watching or resume watching an episode within the show, a second icon 310 configured to allow the first user to watch an episode with others at the same time, and a third icon 315 configured to allow the first user to view additional options. In one example, the first user may be excited about the show depicted in the details screen, and may want to recommend this show to a friend so that they can talk about the show together and share in the excitement. In this example, the first user may select the third icon 315 to start the process of sending a share request to their friend.

Figure 4:
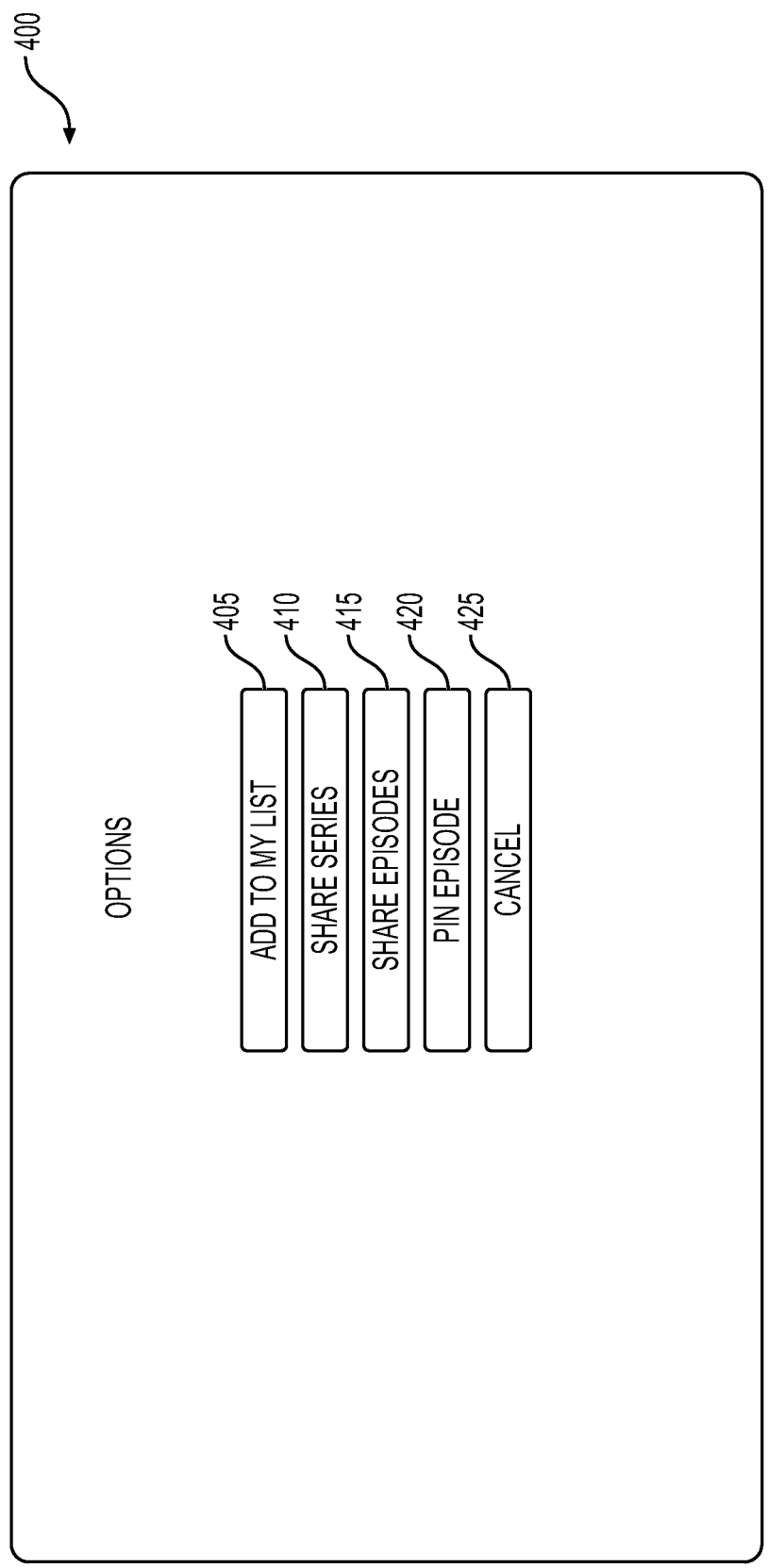
FIG. 4 depicts an exemplary interactive graphical user interface (GUI) for providing different options to a user when the user selects to share multimedia content, according to one or more embodiments.

In FIG. 4, exemplary GUI 400 depicts an "options" screen that provides different options to the first user when the user selects the third icon 315 (shown in FIG. 3) to share the show (e.g., series) provided in exemplary GUI 300. The different options include an "add to my list" icon 405, which is configured to allow the first user to add the show to a list of multimedia content items to watch. The different options also include a "share series" icon 410, which is configured to allow the first user to share the entire series with one or more other users. Alternatively, instead of sharing the entire series with a friend, the first user may opt to share a specific episode within the series by selecting the "share episode" icon 415. The additional options provided in exemplary GUI 400 also include a "pin episode" icon 420 to allow the first user to save a specific episode for later and a "cancel" icon 425 to allow the first user to exit the "options" screen depicted in exemplary GUI 400, and to return to the details screen depicted in exemplary GUI 300 (shown in FIG. 3.)

Figure 5:
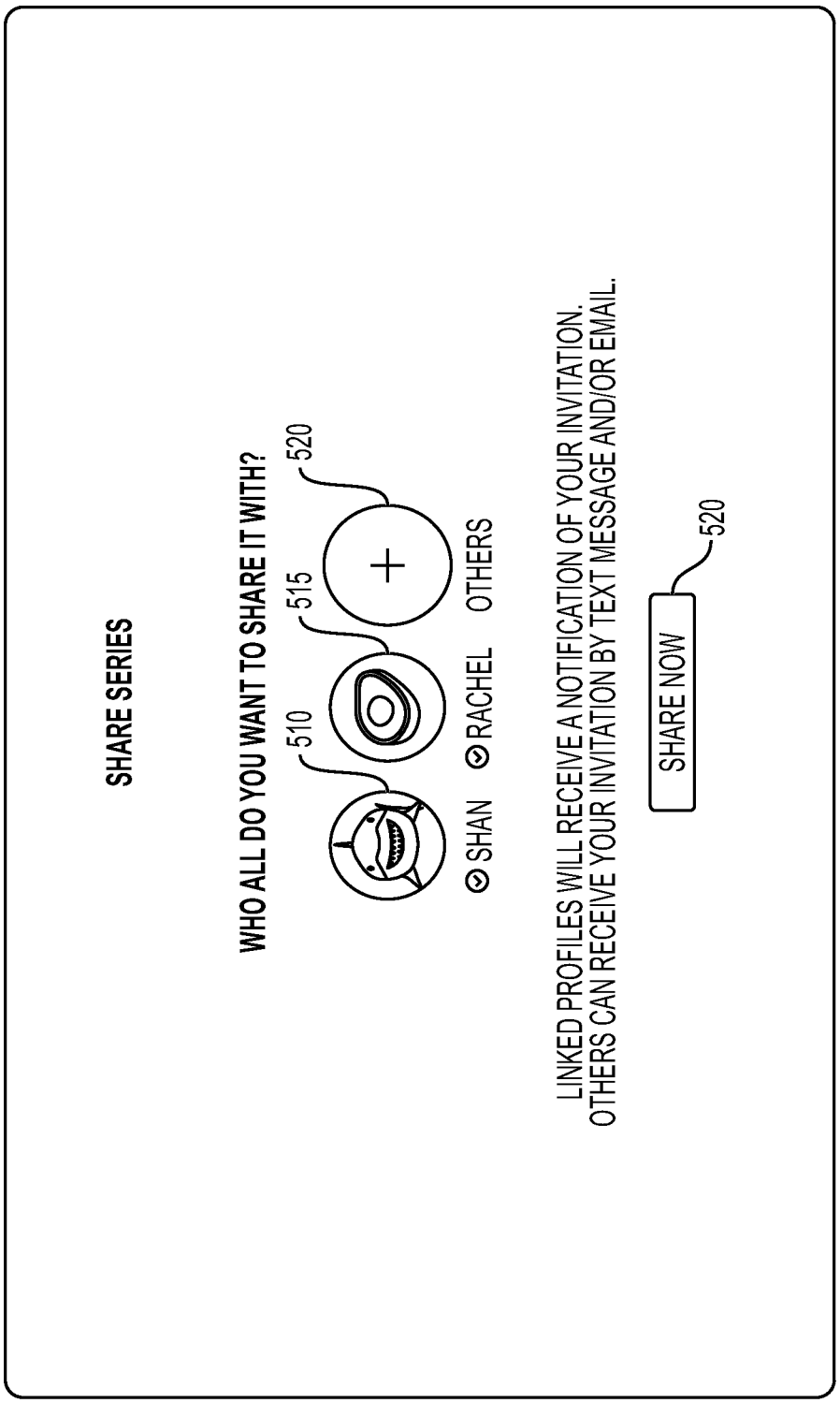
FIG. 5 depicts an exemplary interactive graphical user interface (GUI) for selecting one or more users to share multimedia content with, according to one or more embodiments.

In FIG. 5, exemplary GUI 500 depicts a share series screen that allows the first user to select one or more users to share the show depicted in exemplary GUI 300 with, when the first user selects the "share series" icon 410 (shown in FIG. 4). The "share series" screen depicted in exemplary GUI 500 provides profile icons 510, 515 for those users with whom the first user is already linked together via the profile linking process described above in FIG. 2. As shown in exemplary GUI 500, profile icon 510 is associated with a user profile for a user named Shan, and profile icon 515 is associated with a user profile for a different user named Rachel. A checkmark accompanies each user's name underneath their respective profile icon 510, 515 to indicate that these user profiles are linked with the first user's profile. Additionally, exemplary GUI 500 includes an "others" icon 520, which is configured to allow the first user to search for and send a share request to a user whose user profile is not shown in GUI 500 (e.g., a user whose profile is not linked with the first user's profile). In one example, the first user may select one or both of the profile icons 510, 515 and then select a "share now" icon 520 to share the series with users Shan and/or Rachel.

Figure 6:
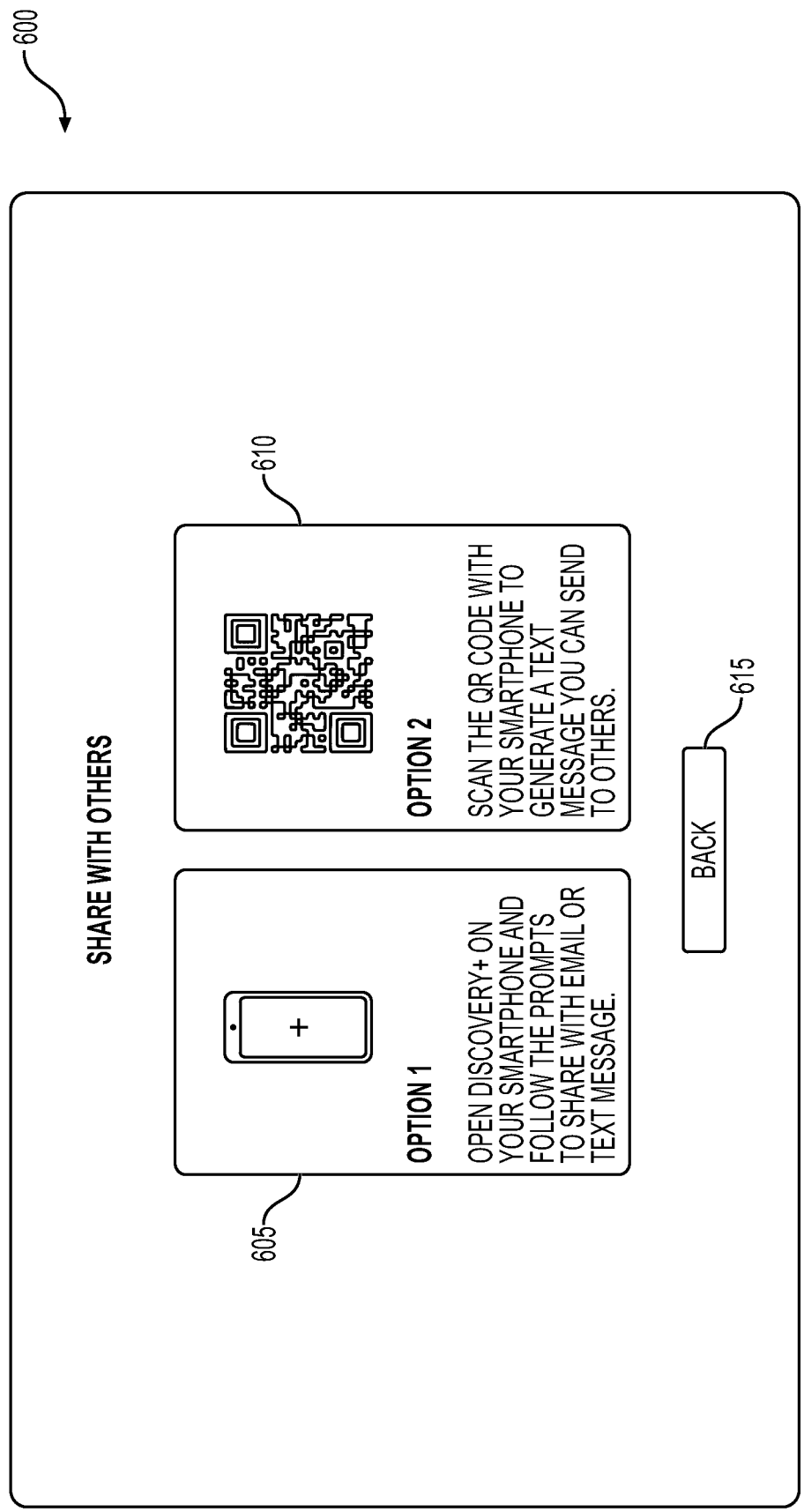
FIG. 6 depicts an exemplary interactive graphical user interface (GUI) for transmitting a request to share multimedia content, according to one or more embodiments.

In FIG. 6, exemplary GUI 600 depicts a "share with others" screen when the first user selects the "others" icon 520 (shown in FIG. 5). The "share with others" screen provides a first option 605 (e.g., "Option 1") and a second option 610 (e.g., "Option 2"). A "back" icon 615 is also provided to allow the first user to return to previous "share series" screen depicted in GUI 500 (shown in FIG. 5). The first option 605 instructs the first user to open the multimedia streaming app on the first user's smartphone (user computing device 105, shown in FIG. 1), and to follow the prompts shown on the smartphone to share the series depicted in exemplary GUI 300 (shown in FIG. 3) with a friend via email or text message. The second option 610 provides a QR code on the exemplary GUI 500, and instructs the first user to scan the displayed QR code with the first user's smartphone to generate a text message that the first user can send to others.

Figure 7:
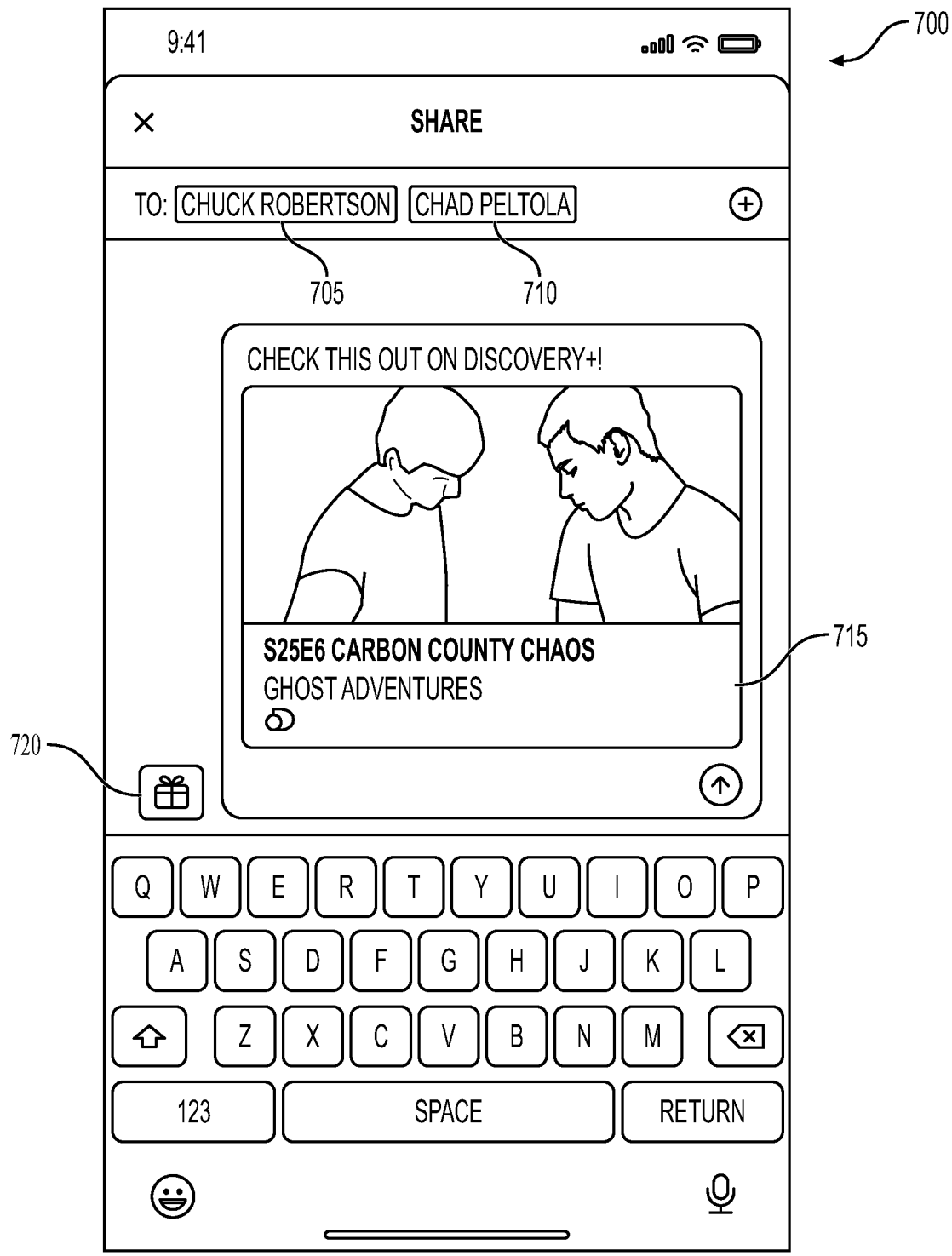
FIG. 7 depicts an exemplary interactive graphical user interface (GUI) for composing a message to share multimedia content, according to one or more embodiments.

In FIG. 7, exemplary GUI 700 depicts a message composer screen for display at the first user's smartphone when the first user selects either the first option 605 or the second option 610 (shown in FIG. 6). The first user may identify message recipients 705, 710 to share the series (shown in FIG. 3) with. For example, the first user may select the message recipients 705, 710 from the first user's contacts (e.g., native address book) within the smartphone. Exemplary GUI 700 also includes a URL 715 (e.g., a link 715) to the series within the message. If the first user knows that one or more of the message recipients 705, 710 are not subscribed to the multimedia streaming platform (e.g., service) operated by the computer server 115, the first user may select a gift icon 720 to add, to the message, a gift subscription to the streaming service platform managed by computer server 115. In some embodiments, the message may be sent to the message recipients 705, 710 from the smartphone's native messaging application ("app").

FIGS. 8-11 depict exemplary interactive graphical user interfaces (GUIs) 800-1100 for receiving a recommendation to watch a multimedia content item from a user (e.g., user 102, shown in FIG. 1), according to one or more embodiments of the present disclosure. More specifically, whereas FIGS. 3-7 depict the first user sending a content recommendation to a friend, FIGS. 8-11 depict the first user receiving a content recommendation from a friend. Exemplary GUIs 800-1100 may be generated by the computer server 115 for display at the first user's user computing device 105 (shown in FIG. 1), such as the first user's TV, personal laptop, or mobile device.

Figure 8:
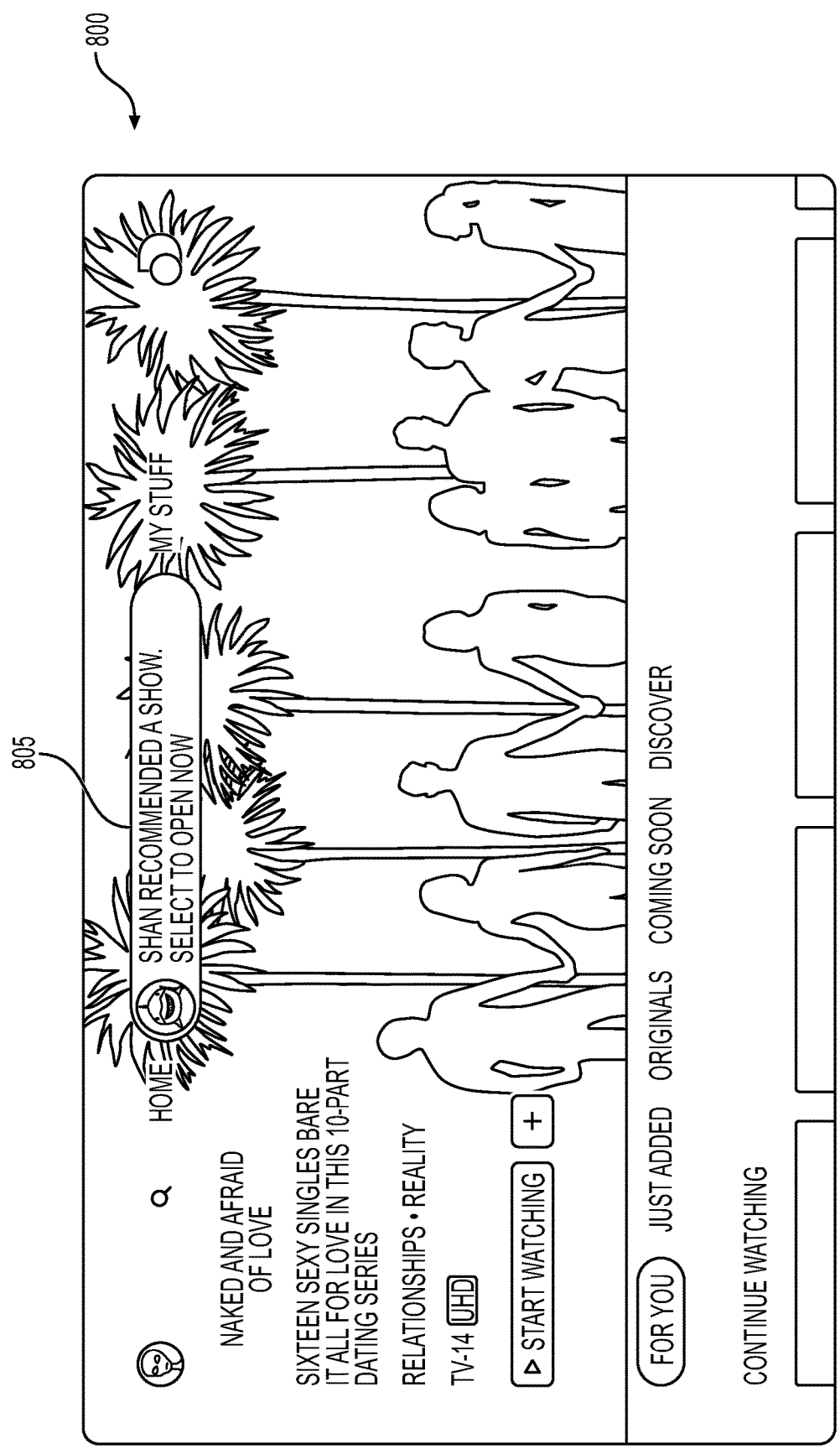
FIG. 8 depicts an exemplary interactive graphical user interface (GUI) for receiving a notification of a share request, according to one or more embodiments.

In FIG. 8, exemplary GUI 800 depicts an in-app notification 805 that is displayed within the multimedia streaming app generated by the computer server 115. The notification 805 may be from another user profile on the same subscription account as the first user or from a linked profile. In exemplary GUI 800, the notification 805 alerts the first user that "Shan recommended a show," and instructs the first user to select the notification 805 to open and view additional information regarding the received recommendation. The first user may select the notification 805 right away with, for example, an input device, such as a remote control, to view the content recommendation. Additionally or alternatively, the first user notification 805 may view the notification 805 at a later time by accessing a "notifications" tab (not shown).

Figure 9:
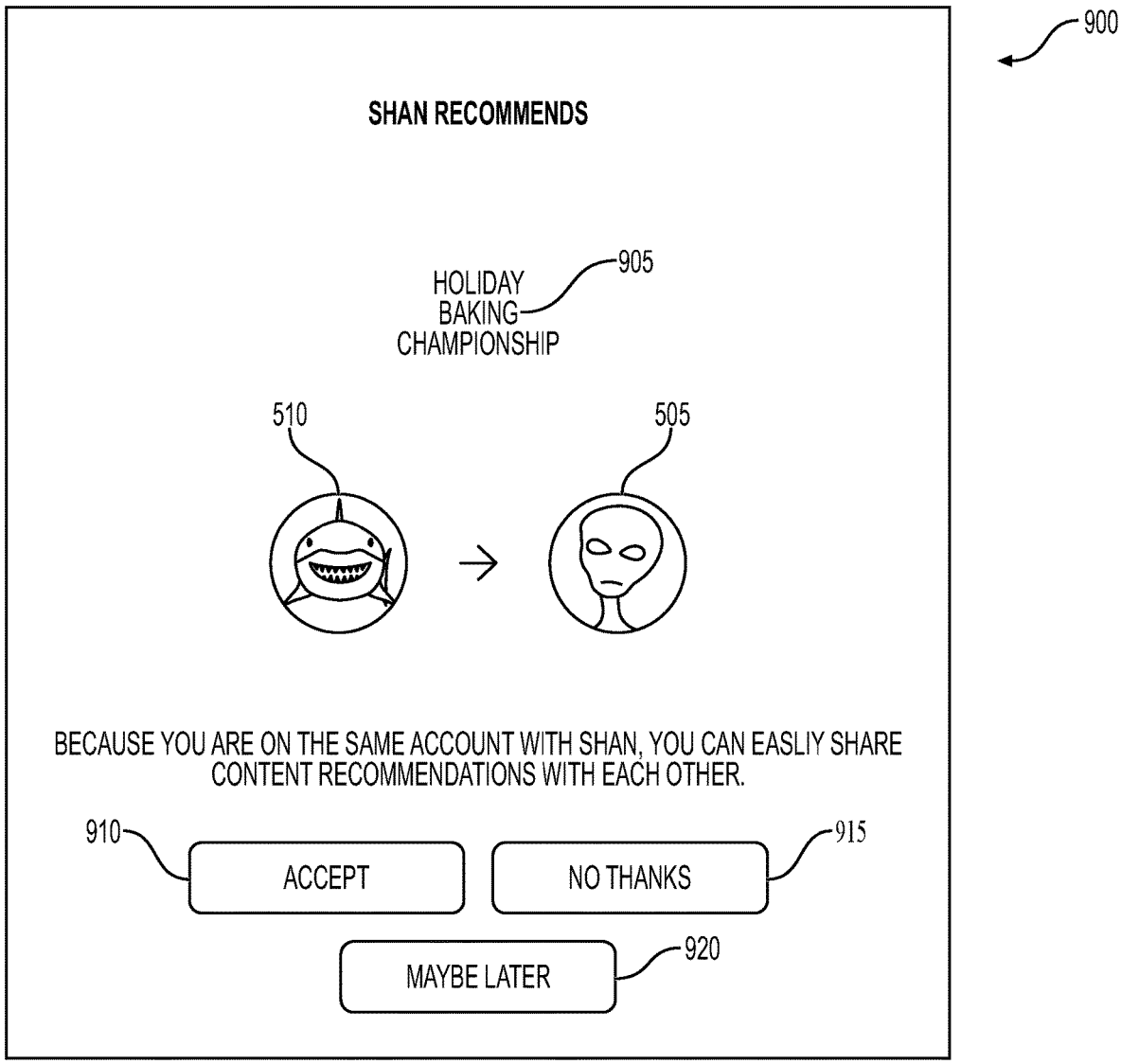
FIG. 9 depicts an exemplary interactive graphical user interface (GUI) for responding to a share request, according to one or more embodiments.

In FIG. 9, exemplary GUI 900 depicts a recommendation screen when the first user selects the notification 805 (shown in FIG. 8) to view the recommendation. The recommendation screen includes a title 905 (or logo) of the recommended show. In exemplary GUI 900, the recommended show is a baking show recommended by Shan, who is on the same subscription account (for the streaming service platform provided by computer server 115) as the first user. The recommendation screen includes an arrow pointing from the profile icon 510 of the user who sent the recommendation (e.g., Shan) to the profile icon 505 of the user receiving the recommendation (e.g., the first user) to clearly illustrate which user is sending the recommendation and which user is receiving the recommendation.

The first user may select an "accept" icon 910 to accept the content recommendation from Shan. If the first user would like to decline the content recommendation, the first user may select a "no thanks" icon 915. If the first user would like to decide whether or not to accept the request at a later time, the first user may select the "maybe later" icon 920. In some embodiments, sharing the same subscription account may allow users to more easily share recommendations with each other.

Figure 10:
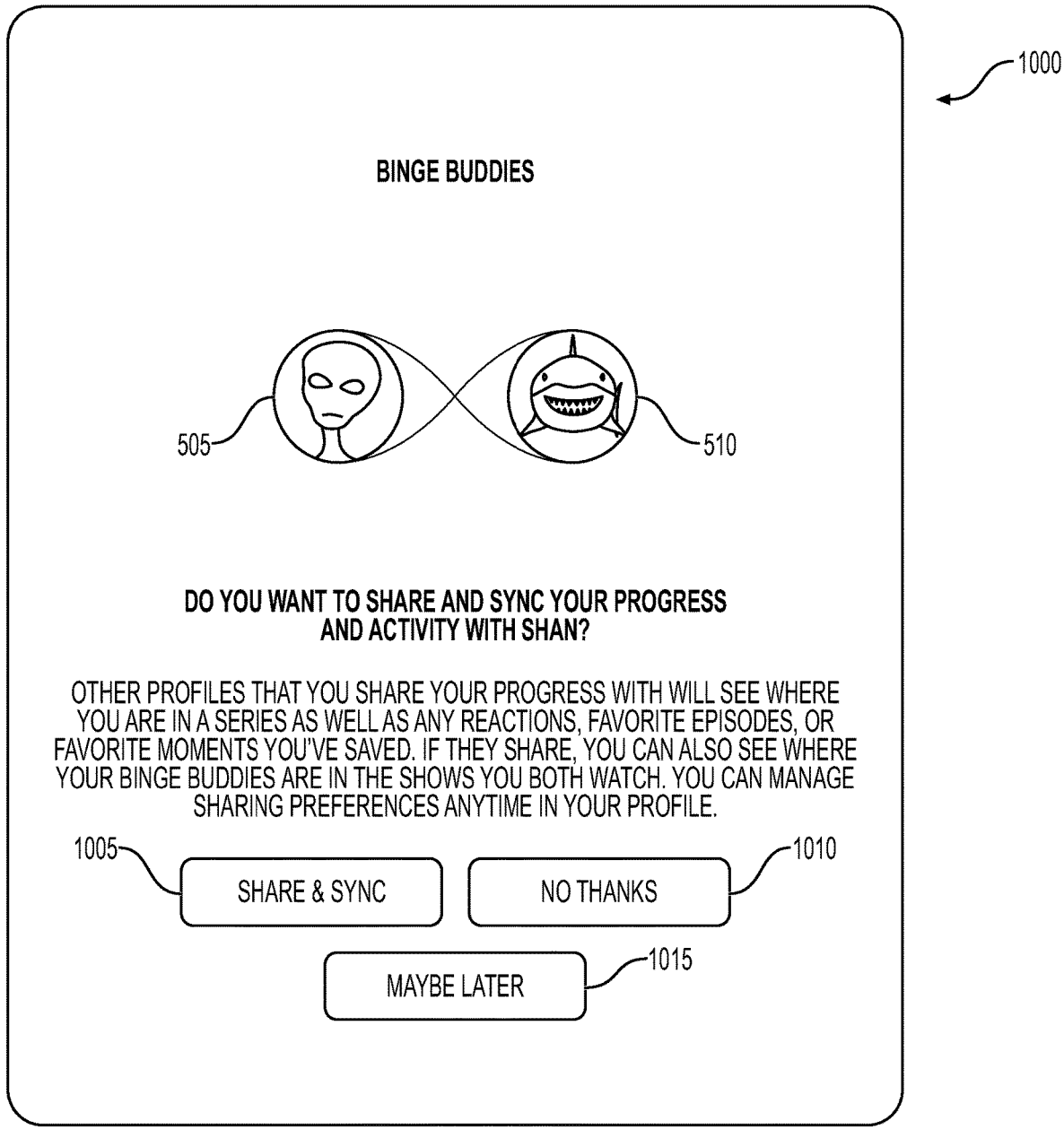
FIG. 10 depicts an exemplary interactive graphical user interface (GUI) for linking users, according to one or more embodiments.

In FIG. 10, exemplary GUI 1000 depicts a "Binge Buddies" screen when the first user selects the "accept" icon 910 (shown in FIG. 9). The "Binge Buddies" screen allows the first user to decide whether to become buddies (e.g., "binge buddies") or become otherwise connected with (e.g., linked to) the user associated with profile icon 510 for the recommended show. Becoming buddies for this specific show allows the two users to share their viewing progress for the show with each other and to allow see each other's comments and reactions. In other words, in exemplary GUI 1000, becoming buddies for the baking show (shown in FIG. 9) would allow the first user and Shan to share and sync their viewing progress and activity for the baking show with one another.

Becoming buddies allows the first user and Shan to view each other's reactions and comments, and to also view episodes or moments (within episodes) that each user has marked as a favorite episode or favorite moment. The first user may select a "share & sync" icon 1005 to become binge buddies with Shan. If the first user does not want to become binge buddies with Shan, the first user may select a "no thanks" icon 1010. In various embodiments, the first user may receive and accept a content recommendation from another user, but decline to share and sync their progress and activity with this user (e.g., decline to become binge buddies). If the first user would like to decide at a later time whether or not to become binge buddies with Shan, the first user may select a "maybe later" icon 1015.

Figure 11:
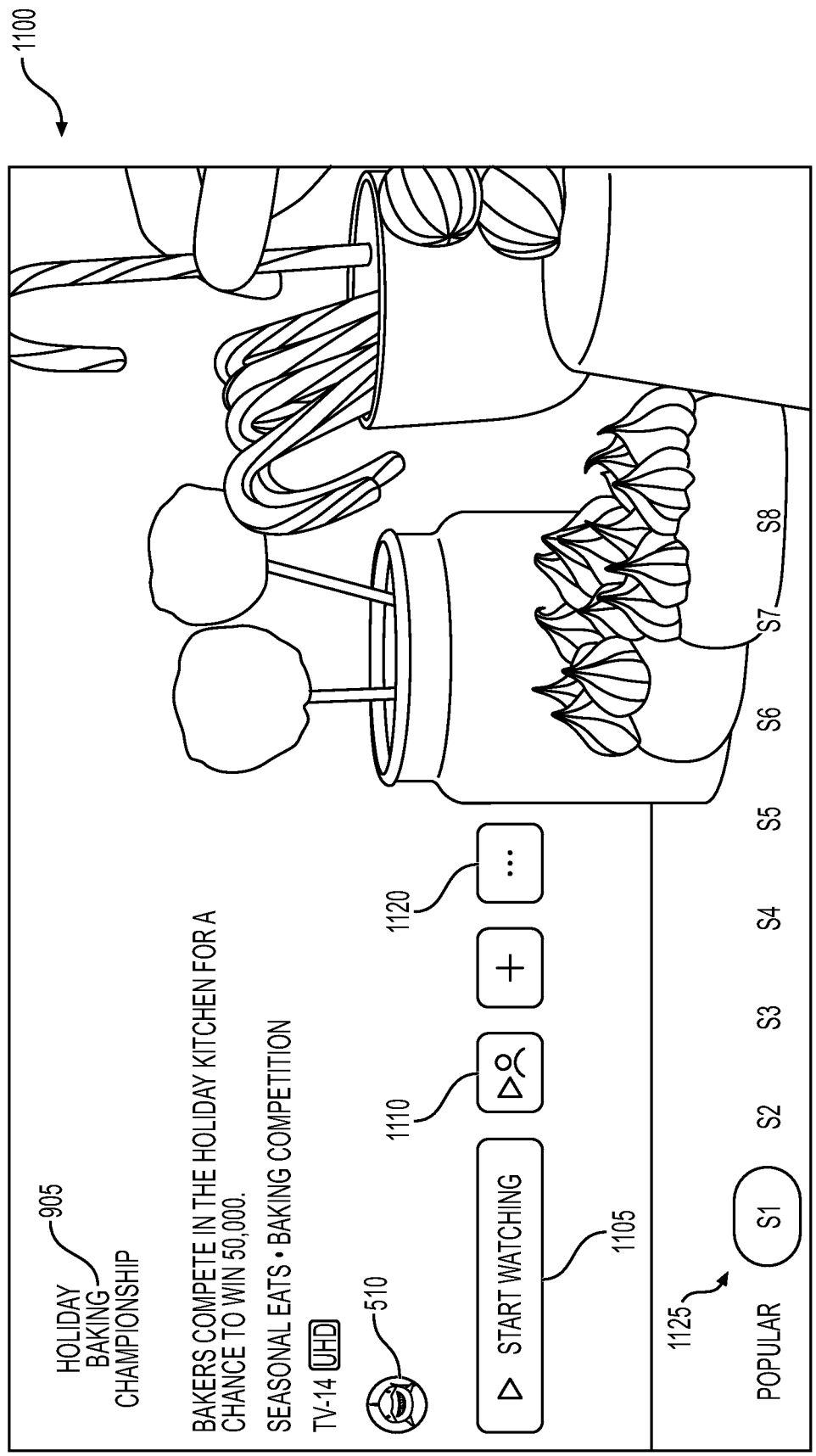
FIG. 11 depicts an exemplary interactive graphical user interface (GUI) for viewing details of a multimedia content, according to one or more embodiments.

In various embodiments, a user may have more than one buddy for a show. In FIG. 11, exemplary GUI 1100 depicts a show's details screen that includes each profile icon with whom a user is buddies with for the show. The exemplary GUI 1100 includes the profile icon 510 associated with Shan's user profile, thereby indicating that the first user is binge buddies with Shan. Similar to the exemplary GUI 300 (shown in FIG. 3), the exemplary GUI 1100 includes a first icon 1105 configured to allow the first user to start watching or resume watching an episode within the show, a second icon 1110 configured to allow the first user to watch an episode with others at the same time, and a third icon 1120 configured to allow the first user to view additional options. The exemplary GUI 1100 also includes a row of seasons 1125 within the baking show depicted by title 905.

As shown in FIG. 10, other user profiles that the first user shares their viewing progress with (e.g., binge buddies) may also see where the first user is in a shared series as well as any reactions, favorite episodes, or favorite moments that the first user has saved for the series. If the other users (e.g., binge buddies) also share their progress with the first user, the first user may also see where the other users are in the shows they watch together. The first user may manage sharing preferences anytime in the first user's user profile.

Figure 12:
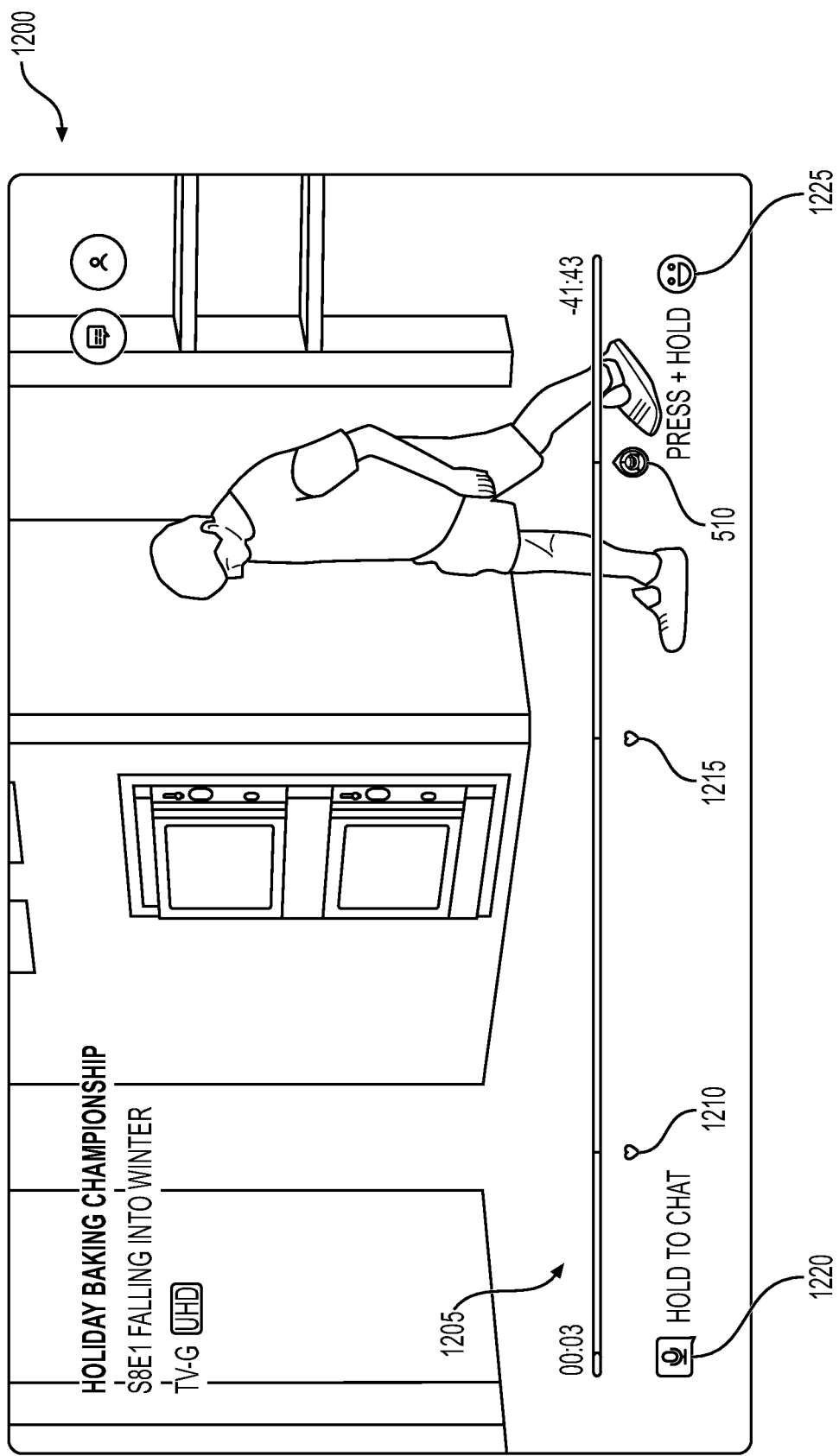
FIG. 12 depicts an exemplary interactive graphical user interface (GUI) for sharing the viewing progress of a multimedia content, according to one or more embodiments.
Figure 13:
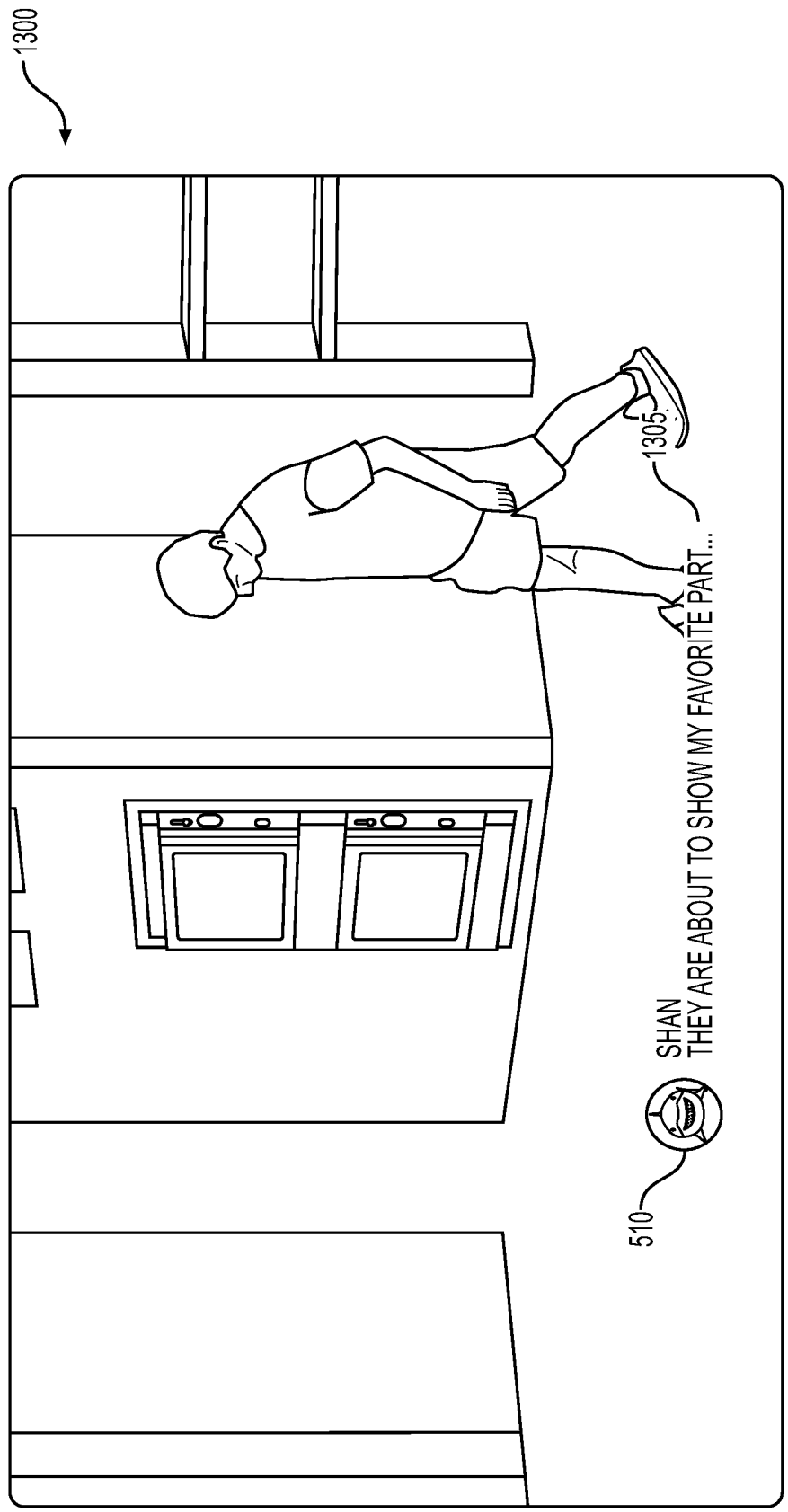
FIG. 13 depicts an exemplary interactive graphical user interface (GUI) for viewing shared comments, according to one or more embodiments.

FIGS. 12-15 depict exemplary interactive graphical user interfaces (GUIs) 1200-1500 that may be generated by the computer server 115 (shown in FIG. 1), according to one or more embodiments of the present disclosure. More specifically, exemplary GUIs 1200 and 1300, as shown in FIGS. 12 and 13, depict an episode of the show associated with the title 905 (shown in FIG. 9) that the first user and Shan (associated with profile icon 510) are asynchronously watching together. Exemplary GUI 1200 includes a playback bar 1205 (e.g., progress bar 1205) that shows where Shan is in the episode by displaying Shan's profile icon 510 near or at a timestamp where Shan last left off in the episode.

The exemplary GUI 1200 may also include heart icons 1210, 1215 near the playback bar 1205 to indicate favorite moments within the episode for Shan and/or the first user. The exemplary GUI 1200 may include a "hold to chat" icon 1220 to allow the users to long-press the icon 1120 to allow the users to speak their comment(s) and have it converted to text (e.g., into a voice-to-text format). Exemplary GUI 1300 of FIG. 13 depicts a comment 1305 shared by Shan (who is associated with profile icon 510) to the first user. The exemplary GUI 1200 may also include a "press+hold" icon 1225 to allow the users to long-press the icon 1225 and view a plurality of reactions on the users' respective user computing devices 105. The plurality of reactions may be overlay controls from which the users may select a reaction to share with each other for a moment within the episode. In some embodiments, users may long-press the "hold to chat" icon 1220 and/or the "press+hold" icon 1225 on an input device, such as, for example, a remote control. Thus, when the first user watches the episode, comments, reactions, and/or favorited moments provided by the first user's buddy (e.g., Shan) may be displayed to the first user as the episode is playing to provide an enhanced sharing experience for the first user.

Figure 14:
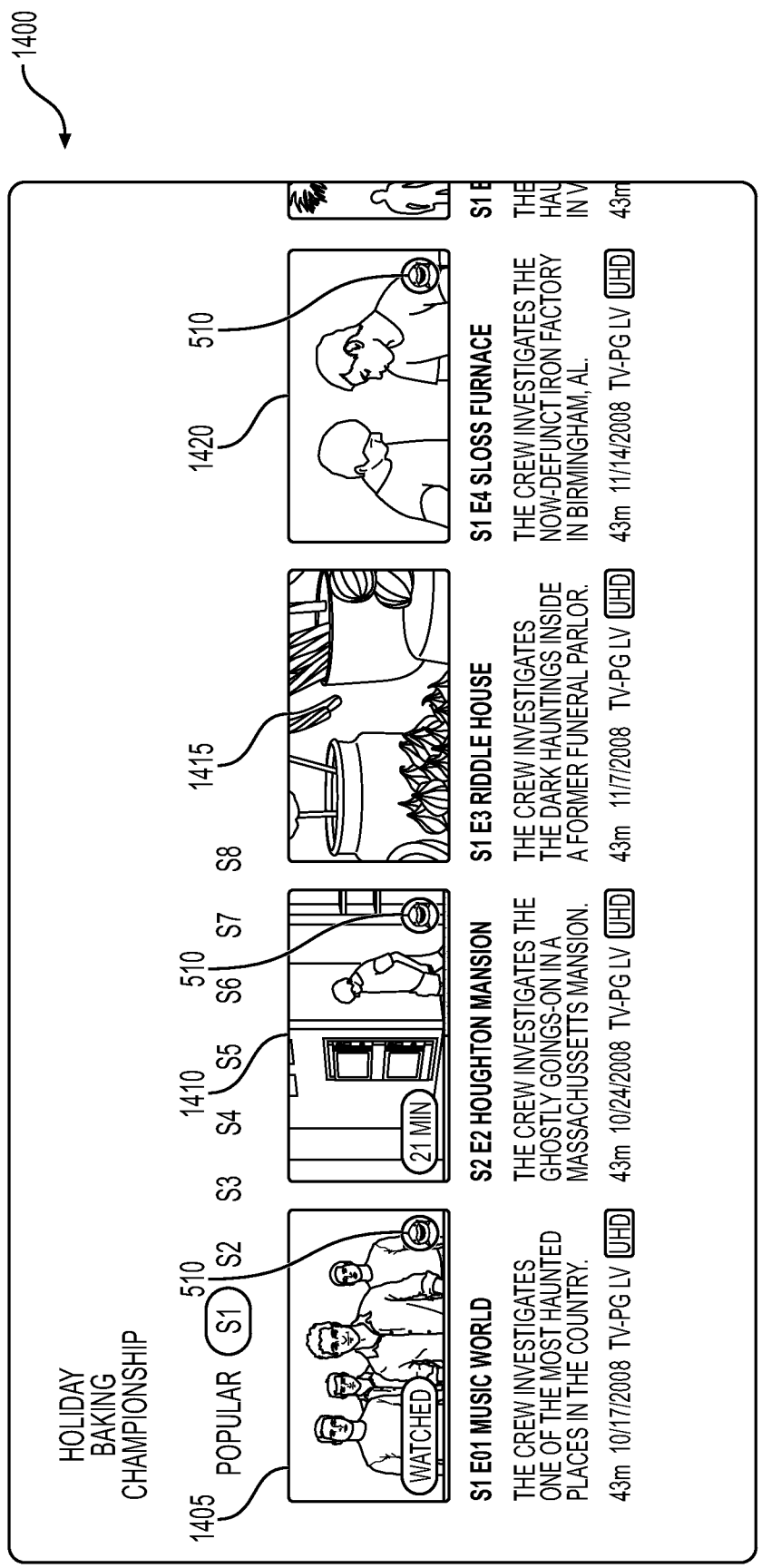
FIG. 14 depicts an exemplary interactive graphical user interface (GUI) for viewing a linked user's progress within a shared video series details, according to one or more embodiments.

In FIG. 14, the exemplary GUI 1400 indicates which episodes within a series that a binge buddy, such as Shan, has watched, is currently watching, and remains to watch (e.g., has not yet watched). The exemplary GUI 1400 includes Shan's profile icon 510 within thumbnails 1405, 1410, 1420 of episodes, for which Shan has finished watching and/or is currently watching. The first user may easily determine from viewing exemplary GUI 1400, that Shan has not yet watched the episode corresponding to thumbnail 1415 because it does not include Shan's profile icon 510. The features shown in exemplary GUIs 1200-1400 allow users, such as the first user and Shan, to enjoy asynchronously watching a show together by enabling these users to see where the other user is within the series and within a specific episode, thereby allowing the users to discuss the show together without spoiling any moments for each other. In further embodiments, the computer server 115 may generate an interactive GUI for display at a user's (e.g., the first user, Shan) device (e.g., user computing device 105, shown in FIG. 1) that indicates whether other, shared multimedia content items (e.g., documentaries, movies) between the user and their buddy (or buddies) have been viewed, are currently being viewed, or remain to be viewed by the user and/or their buddy (or buddies).

In various embodiments, the computer server 115 (shown in FIG. 1) may generate notifications of a user's viewing activity and transmit these notifications to the user's buddy or buddies for a shared content item. For example, if the user has already completed watching an episode and is waiting for their buddy to watch the same episode, the server 115 may transmit a notification to the user as soon as the user's buddy starts watching this episode. The server 115 may also transmit a notification when the user's buddy has completed watching the episode. In some embodiments, the server 115 may generate and transmit, to the user, a summary of the buddy's activity within the episode, including comments, reactions, and favorite moments to enhanced the shared experience between the user and their buddy. In another embodiment, the server 115 may transmit a notification to the buddy who has not completed watching the shared content to notify the buddy that their friend is waiting for them (e.g., "we noticed Shan finished watching MovieA on Saturday, would you like to finish watching MovieA?" or "Shan is waiting for you to finish Season 2, Episode 1 of ShowB, would you like to start watching this episode?").

Figure 15:
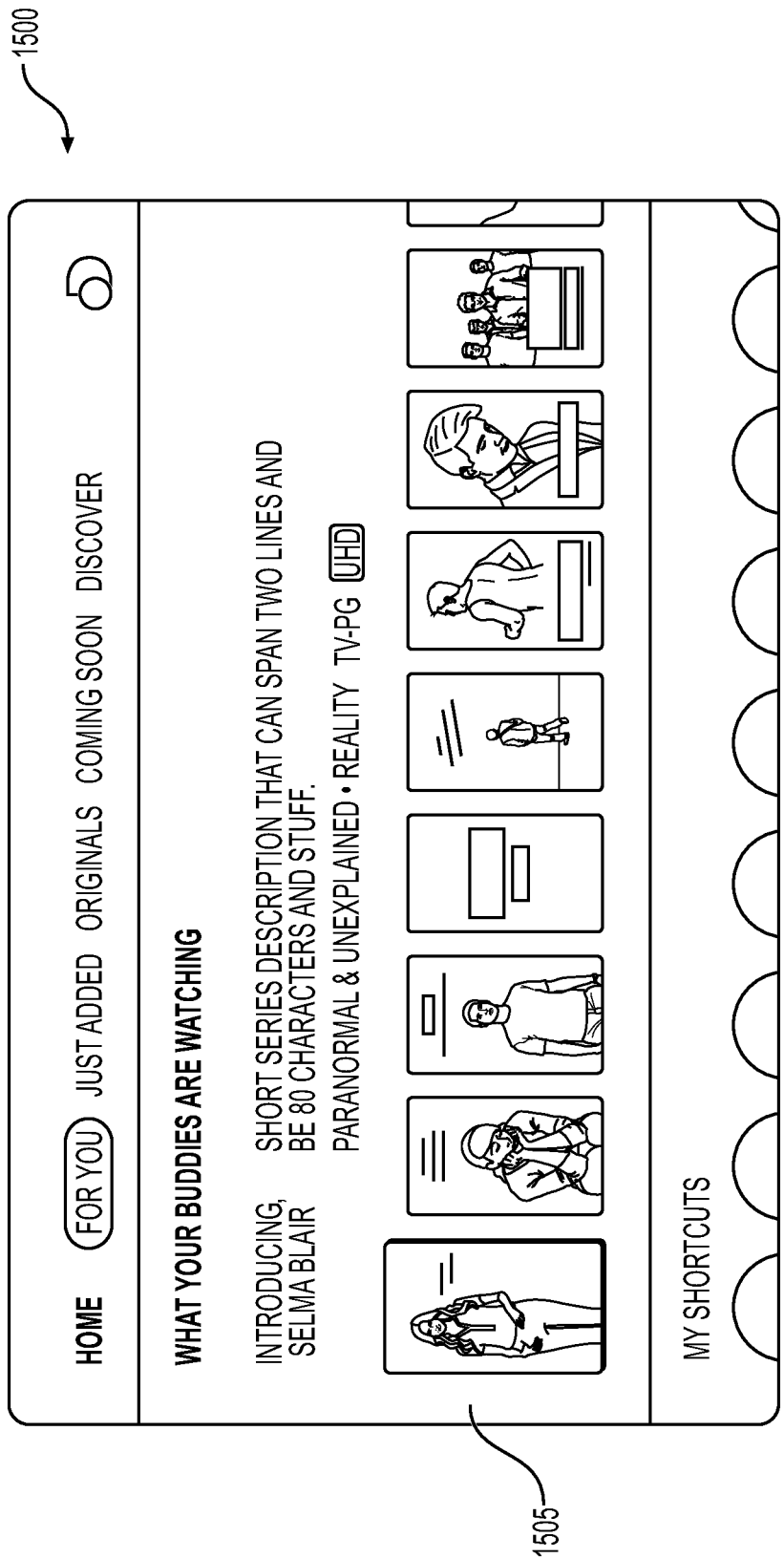
FIG. 15 depicts an exemplary interactive graphical user interface (GUI) for recommending multimedia content, according to one or more embodiments.

In FIG. 15, the exemplary GUI 1500 depicts a recommendation rail 1505 displayed on a home screen for a user. The recommendation rail 1505 includes various multimedia content items, such as shows (e.g., series) and movies recommended by the computer server 115 (shown in FIG. 1) for the user, based on a binge buddy's content activity. Exemplary GUI 1500 displays, within the recommendation rail 1505, content items that the user's buddies are watching. In some embodiments, the recommendation rail 1505 may prioritize or include content items that align with the user's viewing preferences and/or the user's past viewing activity. For example, the computer server 115 may determine, from the user's recent viewing activity, that the user recently enjoys watching cooking programs. Based on this determination, the computer server 115 may include cooking programs that have been watched (or are currently being watched) by the user's buddies in the recommendation rail 1505. In other embodiments, the user's viewing activity may similarly be used by the computer server 115 to recommend content items to one or more of the user's binge buddies on their respective recommendation rails 1505.

Figure 16:
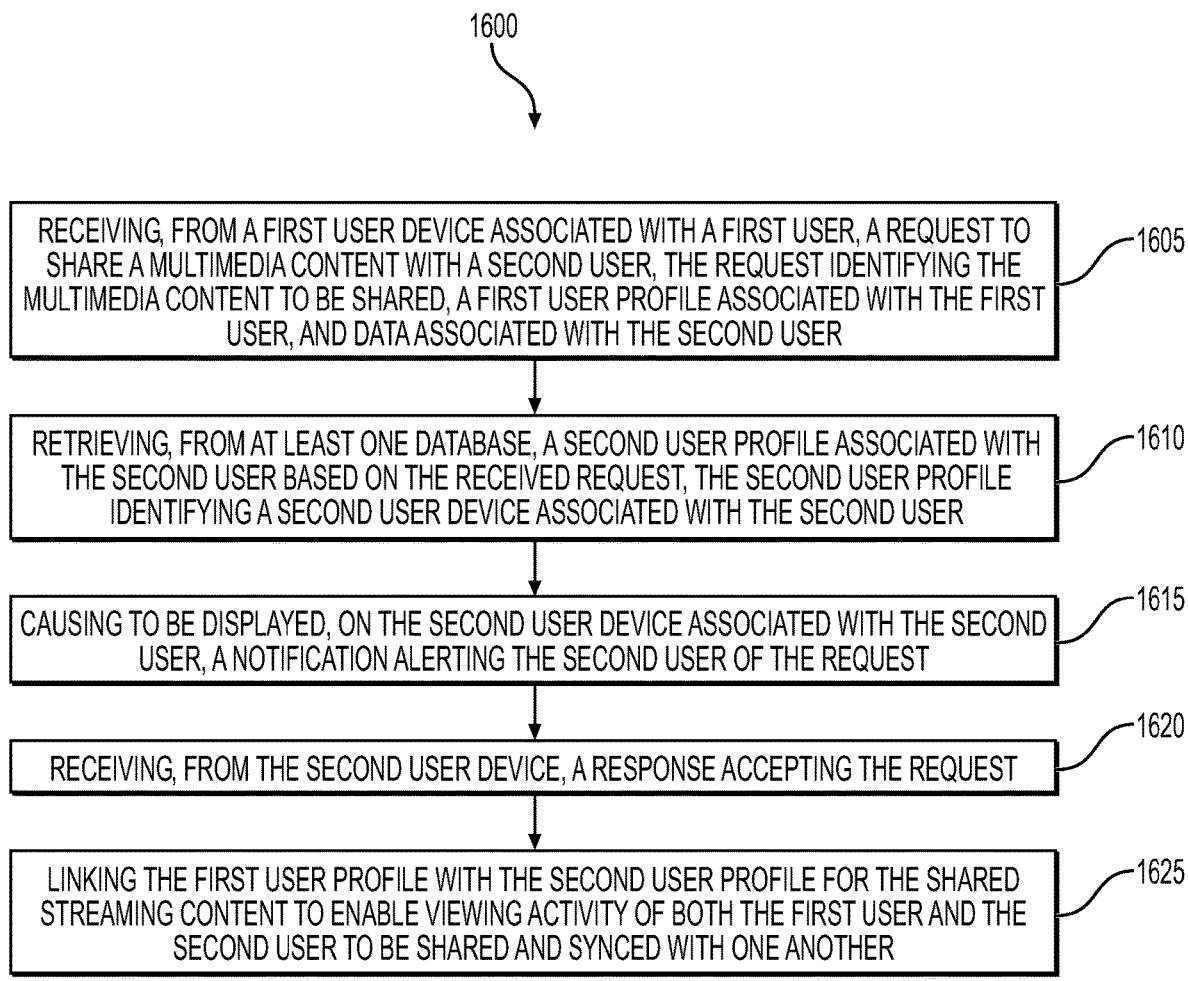
FIG. 16 depicts an exemplary flowchart of a method of providing asynchronous consumption of streaming media, according to one or more embodiments.

FIG. 16 is a flowchart illustrating an exemplary method 1600 for asynchronous consumption of streaming media, according to one or more embodiments of the present disclosure. The method 1600 may be performed by computer server 115 (shown in FIG. 1). Step 1605 may include receiving, from a first user device (e.g., user computing device 105, shown in FIG. 1) associated with a first user, a request to share a multimedia content with a second user. The request may identify (i) the multimedia content to be shared, (ii) a first user profile associated with the first user, and (iii) data associated with the second user.

Step 1610 may include retrieving, from at least one database (e.g., interaction database 120, shown in FIG. 1), a second user profile associated with the second user based on the received request. The second user profile associated with the second user may identify a second user device (e.g., user computing device 105) associated with the second user. As described above, user profiles may include interaction data as well as any additional data received from user computing devices 105 (shown in FIG. 1), including, but not limited to data associated with one or more user computing devices 105 registered by the second user with the computer server 115.

Step 1615 may include causing to be displayed, on a second user device (e.g., user computing device 105) associated with the second user, a notification alerting the second user of the request. As described above with respect to FIG. 8, the second user may receive an in-app notification, such as notification 805 within the multimedia streaming app generated by the computer server 115. Step 1620 may include receiving, from the second user device, a response accepting the request. As described above with respect to FIG. 10, the second user may select the "share & sync" icon 1005 to become binge buddies with the first user. In certain embodiments, instead of causing exemplary GUI 1000 (shown in FIG. 10) to be displayed on the second user device, the computer server 115 may only cause exemplary GUI 900 (shown in FIG. 9) to be displayed. In these embodiments, selecting the "accept" icon 910 in exemplary GUI 900 may have the same effect as the "share & sync" icon 1005 in exemplary GUI 1000. Step 1625 may include linking the first user profile with the second user profile for the shared multimedia content to enable viewing activity of both the first user and the second user to be shared and synced with one another. As described above, with reference to FIGS. 11-14, enabling viewing activity of both the first user and the second user to be shared and synced with one another includes allowing both users to view each other's reactions and comments for a shared content, to view episodes or moments (within episodes) that each user has favorited (e.g., liked), and to view each other's viewing progress within, for example, an episode or a series.

Further aspects of the disclosure are discussed in the additional embodiments below. It should be understood that embodiments in this disclosure are exemplary only, and that other embodiments may include various combinations of features from other embodiments, as well as additional or fewer features.

In general, any process discussed in this disclosure that is understood to be computer-implementable, such as the process illustrated in FIG. 16, may be performed by one or more processors of a computer server, such as computer server 115, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer server. A processor may be a central processing unit (CPU), a graphics processing unit (GPU), or any suitable types of processing unit.

A computer system, such as computer server 115, may include one or more computing devices. If the one or more processors of the computer system are implemented as a plurality of processors, the plurality of processors may be included in a single computing device or distributed among a plurality of computing devices. If a computer server 115 comprises a plurality of computing devices, the memory of the computer server 115 may include the respective memory of each computing device of the plurality of computing devices.

Figure 17:
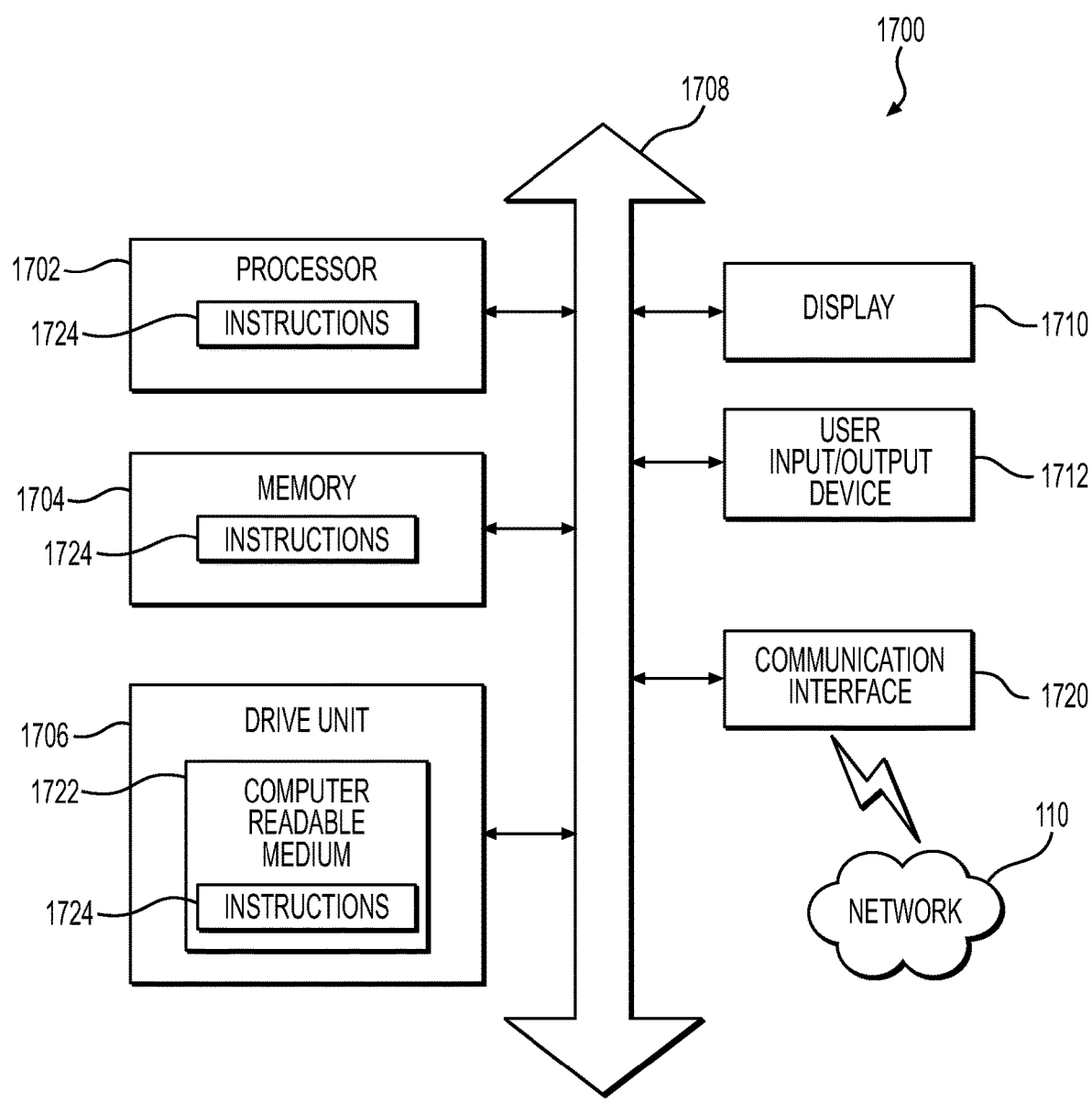
FIG. 17 depicts an exemplary computing server, according to one or more embodiments.

FIG. 17 is a simplified functional block diagram of a computer system 1700 that may be configured as a computing device for executing the process illustrated in FIG. 16, according to exemplary embodiments of the present disclosure. FIG. 17 is a simplified functional block diagram of a computer that may be configured as the computer server 115 according to exemplary embodiments of the present disclosure. In various embodiments, any of the systems herein may be an assembly of hardware including, for example, a data communication interface 1720 for packet data communication. The platform also may include a central processing unit ("CPU") 1702, in the form of one or more processors, for executing program instructions. The platform may include an internal communication bus 1708, and a storage unit 1706 (such as ROM, HDD, SDD, etc.) that may store data on a computer readable medium 1722, although the system 1700 may receive programming and data via network communications. The system 1700 may also have a memory 1704 (such as RAM) storing instructions 1724 for executing techniques presented herein, although the instructions 1724 may be stored temporarily or permanently within other modules of system 1700 (e.g., processor 1702 and/or computer readable medium 1722). The system 1700 also may include input and output ports 1712 and/or a display 1710 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to asynchronous consumption of streaming media, it should be appreciated that the presently disclosed embodiments may be applicable to transmitting data and may be applicable to any environment, such as a desktop or laptop computer, a gaming console environment, and any CTV (connected TV) environment (e.g., an internet-connected device used to watch multimedia content items), etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the process shown in FIG. 16, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A system for asynchronous consumption of streaming media, the system comprising:
   at least one database; and
   a server in network communication with the at least one database, the server configured to perform operations including:
   receiving, from a first user device associated with a first user, a request to share a multimedia content with a second user, the request identifying the multimedia content to be shared, a first user profile associated with the first user, and data associated with the second user;
   retrieving, from the at least one database, a second user profile associated with the second user based on the received request, the second user profile identifying a second user device associated with the second user;
   causing to be displayed, on the second user device associated with the second user, a notification alerting the second user of the request;
   receiving, from the second user device, a response accepting the request;
   linking the first user profile with the second user profile for the shared multimedia content;
   enabling, based on the linking, viewing activity of both the first user and the second user to be shared and synced with one another;
   identifying that one of the first user and the second user has completed viewing the multimedia content and that another of the first user and the second user has not completed viewing the multimedia content; and
   transmitting, to the another of the first user and the second user, a message comprising an integrated link to the multimedia content, the message indicating that the one of the first user and the second user has completed viewing the multimedia content and is waiting for the another of the first user and the second user to finish viewing the multimedia content.

2. The system of claim 1, wherein enabling the viewing activity of both the first user and the second user to be shared and synced with one another further comprises:
   causing to be displayed, on the second user device as the shared multimedia content is playing, comments or reactions received from the first user.

3. The system of claim 2, wherein the comments are received from the first user device in a voice-to-text format.

4. The system of claim 1, wherein the viewing activity includes viewing progress of the first user and the second user within the shared multimedia content.

5. The system of claim 4, wherein the shared multimedia content is a video series that includes a plurality of episodes, and wherein the viewing progress indicates which episodes of the plurality of episodes: have been viewed, are currently being viewed, and remain to be viewed by the first user and the second user.

6. The system of claim 5, wherein the viewing activity includes one or more favorite episodes or favorite moments within the plurality of episodes as indicated by the first user and the second user within the video series.

7. The system of claim 1, wherein the first user profile includes data associated with past viewing activity of the first user, and wherein the second user profile includes data associated with past viewing activity of the second user.

8. The system of claim 7, wherein the server is further configured to perform operations including:
   identifying, based on the second user profile, multimedia content to recommend to the first user; and
   causing to be displayed, on the first user device, a recommendation rail including the identified multimedia content.

9. The system of claim 1, wherein subsequent to receiving the request to share the multimedia content from the first user device, the server is further configured to perform operations including determining that the second user and the second user device are registered with the server.

10. The system of claim 1, wherein the server is further configured to perform operations including:
   receiving, from the first user device, a request to share the multimedia content with a third user, wherein the third user is not registered with the server; and
   causing to be displayed, on the first user device, a QR code configured to be scanned by a mobile device of the first user, to enable the first user to send, to the third user, a text message including a URL of the multimedia content.

11. A computer-implemented method for asynchronous consumption of streaming media using a server in network communication with at least one database, the method comprising operations including:

receiving, from a first user device associated with a first user, a request to share a multimedia content with a second user, the request identifying the multimedia content to be shared, a first user profile associated with the first user, and data associated with the second user;

retrieving, from the at least one database, a second user profile associated with the second user based on the received request, the second user profile identifying a second user device associated with the second user;

causing to be displayed, on the second user device associated with the second user, a notification alerting the second user of the request;

receiving, from the second user device, a response accepting the request; and linking the first user profile with the second user profile for the shared multimedia content;

enabling, based on the linking, viewing activity of both the first user and the second user to be shared and synced with one another;

identifying that one of the first user and the second user has completed viewing the multimedia content and that another of the first user and the second user has not completed viewing the multimedia content; and transmitting, to the another of the first user and the second user, a message comprising an integrated link to the multimedia content, the message indicating that the one of the first user and the second user has completed viewing the multimedia content and is waiting for the another of the first user and the second user to finish viewing the multimedia content.

12. The computer-implemented method of claim 11, wherein enabling the viewing activity of both the first user and the second user to be shared and synced with one another further comprises:

causing to be displayed, on the second user device as the shared multimedia content is playing, comments or reactions received from the first user.

13. The computer-implemented method of claim 12, wherein the comments are received from the first user device in a voice-to-text format.

14. The computer-implemented method of claim 11, wherein the viewing activity includes viewing progress of the first user and the second user within the shared multimedia content.

15. The computer-implemented method of claim 14, wherein the shared multimedia content is a video series that includes a plurality of episodes, and wherein the viewing progress indicates which episodes of the plurality of episodes: have been viewed, are currently being viewed, and remain to be viewed by the first user and the second user.

16. The computer-implemented method of claim 15, wherein the viewing activity includes one or more favorite episodes or favorite moments within the plurality of episodes as indicated by the first user and the second user within the video series.

17. The computer-implemented method of claim 11, comprising further operations including:

identifying, based on the second user profile, multimedia content to recommend to the first user; and causing to be displayed, on the first user device, a recommendation rail including the identified multimedia content.

18. The computer-implemented method of claim 11, wherein subsequent to receiving the request to share the multimedia content from the first user device, the method comprises further operations including determining that the second user and the second user device are registered with the server.

19. A non-transitory computer-readable medium storing computer-executable instructions which, when executed by a server in network communication with at least one database, cause the server to perform operations comprising:

receiving, from a first user device associated with a first user, a request to share a multimedia content with a second user, the request identifying the multimedia content to be shared, a first user profile associated with the first user, and data associated with the second user;

retrieving, from the at least one database, a second user profile associated with the second user based on the received request, the second user profile identifying a second user device associated with the second user;

causing to be displayed, on the second user device associated with the second user, a notification alerting the second user of the request;

receiving, from the second user device, a response accepting the request; and linking the first user profile with the second user profile for the shared multimedia content;

enabling, based on the linking, viewing activity of both the first user and the second user to be shared and synced with one another;

identifying that one of the first user and the second user has completed viewing the multimedia content and that another of the first user and the second user has not completed viewing the multimedia content; and transmitting, to the another of the first user and the second user, a message comprising an integrated link to the multimedia content, the message indicating that the one of the first user and the second user has completed viewing the multimedia content and is waiting for the another of the first user and the second user to finish viewing the multimedia content.

20. The non-transitory computer-readable medium of claim 19, wherein enabling the viewing activity of both the first user and the second user to be shared and synced with one another further comprises:

causing to be displayed, on the second user device as the shared multimedia content is playing, comments or reactions received from the first user.

\* \* \* \* \*